(12) United States Patent
Carson et al.

(10) Patent No.: US 10,796,553 B2
(45) Date of Patent: Oct. 6, 2020

(54) METHOD AND SYSTEM TO MONITOR CONTAINER CONDITIONS

(71) Applicant: BREAKWALL ANALYTICS, LLC, Cleveland, OH (US)

(72) Inventors: Justin Carson, Cleveland, OH (US); Christopher Armenio, Cleveland, OH (US); Michael Dougherty, Cleveland, OH (US)

(73) Assignee: BREAKWALL ANALYTICS, LLC, Cleveland, OH (US)

( * ) Notice: Subject to any disclaimer, the term of this patent is extended or adjusted under 35 U.S.C. 154(b) by 249 days.

(21) Appl. No.: 16/009,465

(22) Filed: Jun. 15, 2018

(65) Prior Publication Data
US 2018/0365964 A1    Dec. 20, 2018

Related U.S. Application Data

(60) Provisional application No. 62/520,216, filed on Jun. 15, 2017.

(51) Int. Cl.
| | |
|---|---|
| *G01J 1/44* | (2006.01) |
| *G01L 5/00* | (2006.01) |
| *G01K 13/02* | (2006.01) |
| *G08B 21/18* | (2006.01) |
| *G01K 3/00* | (2006.01) |
| *G01K 1/02* | (2006.01) |
| *G01J 1/02* | (2006.01) |
| *G01M 3/22* | (2006.01) |
| *G06Q 10/08* | (2012.01) |

(52) U.S. Cl.
CPC .......... *G08B 21/182* (2013.01); *G01J 1/0219* (2013.01); *G01J 1/44* (2013.01); *G01K 1/022* (2013.01); *G01K 3/005* (2013.01); *G01K 13/02* (2013.01); *G01L 5/0052* (2013.01); *G01M 3/226* (2013.01); *G06Q 10/087* (2013.01)

(58) Field of Classification Search
CPC ...... G08B 21/182; G01K 1/022; G01K 3/005; G01K 13/02; G01J 1/0219; G01J 1/44; G01M 3/226; G01L 5/0052; G06Q 10/087
See application file for complete search history.

(56) References Cited

U.S. PATENT DOCUMENTS

| | | | | |
|---|---|---|---|---|
| 9,894,471 | B1* | 2/2018 | Zalewski | H04W 4/70 |
| 10,083,431 | B2* | 9/2018 | Jones | G06Q 10/083 |
| 10,677,886 | B2* | 6/2020 | Meadow | G01S 5/14 |
| 2018/0322449 | A1* | 11/2018 | Schiller | G06Q 30/0633 |

(Continued)

*Primary Examiner* — Mohammad K Islam
(74) *Attorney, Agent, or Firm* — Tucker Ellis LLP; Carlos Garritano

(57) ABSTRACT

Systems and methods of the invention relate to methods and systems that collect data regarding a keg or container via a sensor, wherein such data collected is used to glean information regarding the container, the contents of the container, a location of the container, or an environment in which the container resides. The sensor can be affixed to a container which communicates wirelessly with a gateway device and the gateway device communicates such collected data to a track component. The track component can be configured to receive data from the sensor(s) and gateway device(s) and identify conditions to improve the quality of the contents of the container, track a location of the container, and among others.

20 Claims, 11 Drawing Sheets

(56) References Cited

U.S. PATENT DOCUMENTS

| | | | |
|---|---|---|---|
| 2018/0336515 A1* | 11/2018 | Mehring | H04L 9/0637 |
| 2018/0365771 A1* | 12/2018 | Kilburn | G07C 5/02 |
| 2019/0120929 A1* | 4/2019 | Meadow | G01S 5/14 |
| 2019/0318607 A1* | 10/2019 | Johnson | G08B 13/08 |

* cited by examiner

METHOD AND SYSTEM TO MONITOR CONTAINER CONDITIONS

CROSS-REFERENCE(S) TO RELATED APPLICATIONS

This application claims priority to and the benefit of U.S. Provisional Application Ser. No. 62/520,216 filed on Jun. 15, 2017. The entirety of which is incorporated herein by reference.

TECHNICAL FIELD

Embodiments of the subject matter disclosed herein relate to a container monitoring system that utilizes a gateway and a sensor on a container to identify conditions of the container and/or a contents of the container.

DISCUSSION OF ART

Beverages can be conveyed in pipes or ducts from a supply, such as a container or keg, to an outlet (e.g., tap, spout, and the like) for dispensing purposes. Such arrangements can be found in bars, restaurants, hotels and associated industries, where the beverage is supplied in a pipeline (e.g., line, hose, tube, and the like) conveyed to a tap located adjacent to a bar or serving station. The container is typically specific to a maker of the contents and such maker often owns the container, wherein the responsibility of repairing, replacing, and purchasing the containers is by the maker. The containers are a costly item that are often stolen for scrap or stolen to selfishly indulge the contents of the container.

It may be desirable to have a system and method that differs from those systems and methods that are currently available for containers.

BRIEF DESCRIPTION

In an embodiment, a system is provided that includes at least the following: a container having a top, a bottom opposite the top, a sidewall in between the top and the bottom, the container configured to hold a volume under a pressure; a sensor coupled to the container, the sensor tracks a temperature of the container, an amount of impact taken to the container, and a light exposure to the container; a gateway device that wirelessly receives data from the sensor based on the sensor coming within a predefined distance of the gateway device, upon coming within the predefined distance, the sensor communicates a first data package that includes the temperature, the amount of impact, the light exposure and an identification of the sensor; the gateway device creates a second data package that includes a time stamp of when the first data package was communicated, an identification of the gateway, and the first data package; a track component that receives the second data package and identifies a geographic location of the container and one or more parameters related to at least one of the container, a content of the container, or an environment in which the container resides.

BRIEF DESCRIPTION OF THE DRAWINGS

Reference is made to the accompanying drawings in which particular embodiments and further benefits of the invention are illustrated as described in more detail in the description below, in which.

Figure 1:
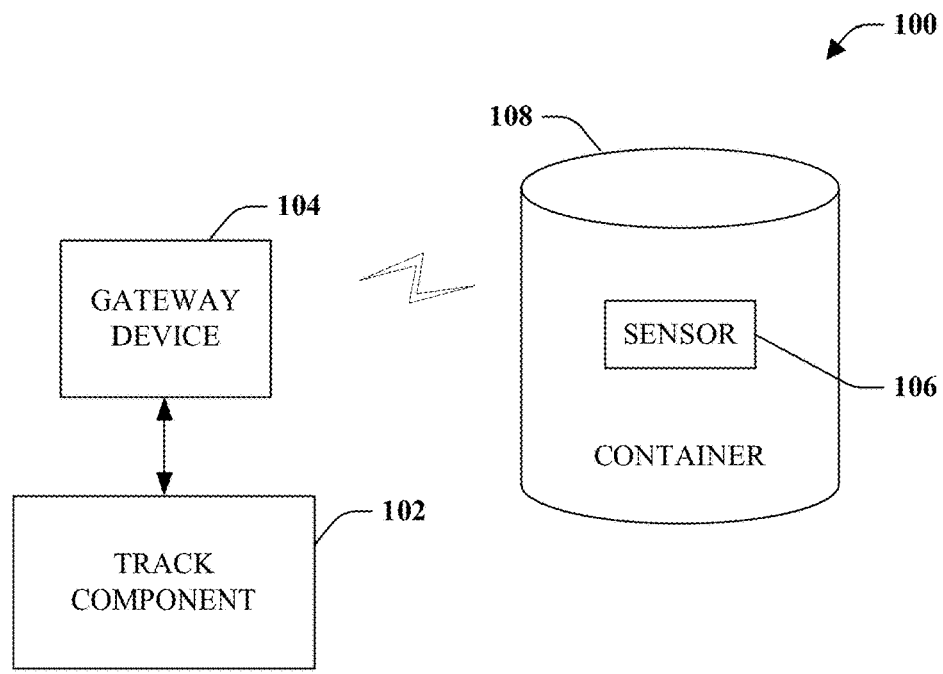
FIG. 1 is a block diagram a system that aggregates information related to a container.

APPENDIX A is a document that describes aspects of the claimed subject matter, and this Appendix forms part of this specification; and APPENDIX B is a document that describes aspects of the claimed subject matter, and this Appendix forms part of this specification.

DETAILED DESCRIPTION OF THE INVENTION

Embodiments of the innovation relate to methods and systems that collect data regarding a keg or container via a sensor, wherein such data collected is used to glean information regarding the container, the contents of the container, a location of the container, or an environment in which the container resides. The sensor can be affixed to a container which communicates wirelessly with a gateway device and the gateway device communicates such collected data to a track component. The track component can be configured to receive data from the sensor(s) and gateway device(s) and identify conditions to improve the quality of the contents of the container, track a location of the container, and among others.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute.

The term "beverage" as used herein can be defined as any consumable liquid such as drinks, soda, carbonated drinks, non-carbonated drinks, juice, energy drinks, soda pop, water, soda water, tonic, milk, beverages dispensed with $CO_2$, beverages dispensed with a line or a hose, alcohol, beer, a combination thereof, and the like.

The term "container" as used herein can be defined as a storage device that can contain, store, and/or transport, a volume of a material such as a liquid, a semi-liquid, or gas.

The term "electric valve" as used herein can be defined as a valve that can be controlled with an electric signal, signal, wireless signal, and the like. The electric valve can be, but is not limited to, a solenoid valve.

FIG. 1 is an illustration of a system 100 that facilitates tracking a container 108 and/or a contents of the container 108. The system 100 can include a track component 102 that is configured to communicate with a gateway device 104 in which signals can be transmitted from the track component 102 to the gateway device 104 and signals can be received by the track component 102 from the gateway device 104. A sensor 106 can be coupled to the container 108, wherein the sensor 106 can transmit a signal packaged with a portion of data to the gateway device 104. The sensor 106 can be coupled, affixed, or releaseably coupled to the container 108 on a location such as, but not limited to, a top, a bottom, a sidewall, an inside wall, an outside wall, a handle, a combination thereof, among others. The sensor 106 is configured to communicate wirelessly to the gateway device 104 within a predefined distance between one another. Once within the predefined distance, the sensor 104 can be configured to communicate data (e.g., a first package of data) on a periodic basis to the gateway device 104. It is to be appreciated that the sensor 106 can transmit and/or receive data wirelessly or wired with the gateway device 104. Moreover, it is to be appreciated that the gateway device 104 can transmit and/or receive data wirelessly or wired with the track component 102. Additionally, the track component 102 can communicate with the gateway device 104 and/or the sensor 106 in a wired technique, a wireless technique, or a combination thereof.

It is to be appreciated that the system 100 can include one or more gateway devices 104, wherein each gateway can be at a geographic location and that the one or more gateway devices 104 can receive data from and/or transmit data to one or more sensors coupled to respective containers. Moreover, each location can include a respective track component 102 to ascertain a condition of the container 108 and/or a condition of the contents in the container 108.

The gateway device 104 can receive the first package of data from the sensor 106, wherein the first package of data can include a unique universal identification (UUID) of the container 108 as well as data related to modules of the sensor 106. The sensor 106 can include modules that allow detection of an amount of light exposure, an amount of movement of or impact to the container 108, a temperature of the container 108 or the temperature of an environment the container 108 is located, an amount of contents dispensed from the container 108 or an amount of contents filled into the container 108, among others. It is to be appreciated that the sensor 106 can include a module that is configured to detect a parameter related to the container 108 or the contents of the container 108 to improve quality or condition of at least one of the container 108 or the contents of the container 108.

The gateway device 104 can be placed at a geographic location and the gateway device 104 can include a unique universal identification (UUID). If the sensor 106 is within the predefined distance, data is communicated from the sensor 106 to the gateway device 104 and can be referred to as a first data package. The first data package can include the UUID of the sensor and data from the modules of the sensor 106 (e.g., readings, numerical information, etc.). The gateway device 104 can receive the first package data and can communicate a second data package to the track component 102, wherein the second data package can include at least the contents of the first data package, a UUID of the gateway device 104 (also referred to as GW ID), a timestamp, or a combination thereof. The gateway device 104 can be configured to transmit data to the track component 102 on a periodic basis which can be a predefined period of time, a manually set period of time, or a combination thereof.

The track component 102 can be configured to receive the second data package and utilize such information to identify a geographic location of the container 108 as well as a condition of the container 108 or a condition of the contents of the container 108. The geographic location of the container 108 can be identified based on the track component 102 evaluating at least the UUID of the gateway, the timestamp, the UUID of the sensor, and which container that sensor having the UUID is affixed. Based on the geographic location of the gateway device 104 and the timestamp at which data is received from the sensor 106, the container location can be tracked. Gateway device 104 can be placed at various geographic locations such as, but not limited to, shipping area, receiving area, delivery locations, delivery trucks, coolers/refrigerators, ports, train depots, among others. In another embodiment, a smartphone or electronic device can be used to receive/transmit data (e.g., the first data package, the second data package, or a combination thereof) wirelessly and communicate such data to the track component via cellular networks or a Wi-Fi network.

By way of example and not limitation, at least one of the first package of data or the second package of data can further include data related to the contents of the container 108 such as a name, a brewer, a style, a type of drink, an alcohol by volume (ABV), an international bittering units (IBU), a preferred date of consumption, an expiration date, a shipping date, a brewing date, a received or delivered date, a geographic tag related to brew location, a geographic tag related to delivery location, recommended or predefined temperatures for contents or glycol, recommended or predefined range of light exposure, recommended or predefined force tolerances for container, recommended or predefined pressure, or a combination thereof. It is to be appreciated that the first package of data or the second package of data can be created or appended with data based on information collected from the sensor 106, the gateway device 104, or the track component 102. In still another embodiment, the first package of data or the second package of data can be communicate to or updated by a device through a direct communication.

In an embodiment, the predefined range can be approximately between 100 meters and 500 meters. In another embodiment, the range can be dependent on a range associated with a distance between at least two of a shipping entrance, a refrigerator system, an unloading dock, an entrance, a cooler, a storage area, a garage entrance, a tap, a room having a cooling system, a room having a glycol unit, among others. In another embodiment, the predefined range can be between six (6) inches and 100 meters. In another embodiment, the predefined range can be between six (6) inches and 1 meter. It is to be appreciated that the predefined range can be selected with sound engineering judgment without departing from the scope of the subject innovation.

In an embodiment, the predefined range can be 300 meters. In another embodiment, the periodic basis for the sensor 106 to communicate to the gateway device 104 is 4-5 seconds but can be within a range of 1 second to 5 minutes. In an embodiment, the periodic basis for the gateway device 104 to communicate with the track component 102 can be 1 minute but can be within a range of 1/10 of a second to 10 minutes.

In another embodiment, the system 100 can include a first set of gateway devices and a second set of gateway devices, wherein the first set of gateway devices are controlled by a first track component and the second set of gateway devices are controlled by a second track component. In such embodiment, the first track component can be managed by the distributor of the contents of the container and the second track component can be managed by the business selling the contents of the container to the end user.

It is to be appreciated that the contents of the container 108 can be a liquid, a semi-liquid, a beverage, a beer, a cider, an alcoholic beverage, a drinkable liquid, a consumable beverage, a gas, among others. In another embodiment, the track component 102 is managed by a beverage distributor and the one or more gateway devices are at locations such as, but not limited, a brewery, a restaurant, a bar, a cooler, a refrigerator, a shipping location, a receiving location, a delivery truck, a delivery vehicle or mode of transportation, hospital facility (e.g., $O_2$ containers used/returned, etc.), nursing facility (e.g., $O_2$ containers used/returned, etc.), among others.

As discussed above, the sensor 106 can be coupled, affixed, or releaseably coupled to the container 108 on a location such as, but not limited to, a top, a bottom, a sidewall, an inside wall, an outside wall, a handle, a combination thereof, among others. In addition, the sensor 106 can be a ring component that is located on a top of the container 108 or a bottom of the container 108. In an embodiment, the sensor 106 can be situated on a bottom of the container 108 to collect data related to a weight of the container 108. The data related to a weight of the container 108 can be utilized by the system 100 to identify a fill level of the container 108 (e.g., empty, low, full, an amount between empty and full). Upon a detection of a weight that meets or approaches a predefined or defined threshold, the track component 102 can communicate a notification that the container 108 is low on contents and/or request an order for another container 108. It is to be appreciated that the detection of an empty or low container 108 can trigger at least one of a notification to a distributor to delivery another container 108, management of order or purchase of one or more containers 108, initiate an automatic sale and purchase of one or more containers 108 with contents identified that are low or empty. In another embodiment, the sensor 106 can be incorporated into a collar, coupler or a tap that couples to an opening on the container 108 in a direct or indirect manner.

In an embodiment, the track component 102 can evaluate data collected by the sensor 106 to dynamically identify an expiration period of time for a specific content in the container 108. The track component 102 can evaluate data collected by the sensor and, dependent on the data from the sensor and/or with the specific contents and recipe of the contents in the container, generate at least one of an expiration data, a range of dates for expiration, an amount of time prior to expiration, a lower amount of time limit and a higher amount of time limit prior to expiration, a manufacturer or brewer suggested consumption date, or a combination thereof. For instance, a weight can be given to each parameter measured or collected by a sensor for a particular content of the container and a formula can be utilized to output a date related to expiration or suggested consumption date. In another embodiment, the track component 102 can be configured to analyze the historic data from the contents of the containers based on specific contents and correlate end user feedback on quality in order to generate the date related to expiration or suggested consumption date.

In still another embodiment, the gateway device 104 can be situated at a brewery in which upon filling the container 108 with contents, data is communicated to the sensor 106. In particular, the data can be written to the sensor 106 that includes, but is not limited to, batch number, date brewed, brew master responsible, geographic location of brewery, type of contents, ABV, IBU, name of contents, among others. It is to be appreciated that such information on the sensor 106 can be communicated to an additional gateway device located at a location that is down a supply chain after a brewery (e.g., middle man or distributor, customer or end user).

Figure 2:
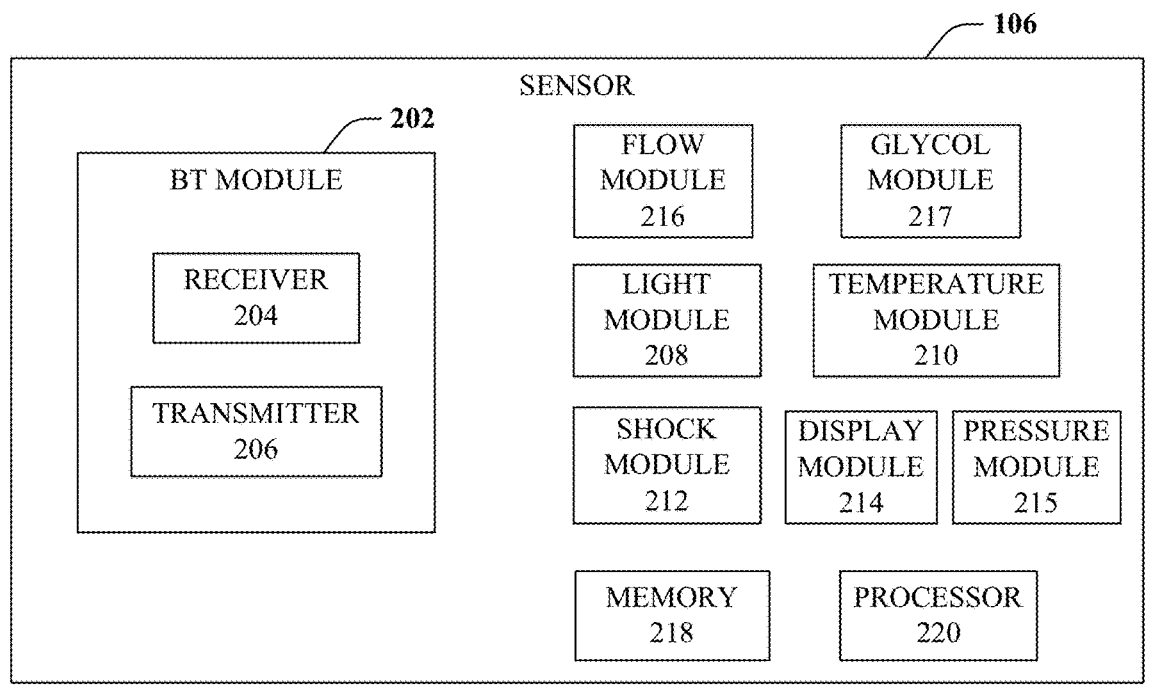
FIG. 2 is an illustration of a sensor.

FIG. 2 illustrates the sensor 106. The sensor 106 can include a BT module 202 that is configured to wirelessly transmit and/or receive data. The BT module 202 can include a receiver 204 and a transmitter 206. It is to be appreciated that the sensor 106 can utilize a wireless technology to transmit and/or receive data and such wireless technology can be Bluetooth® low energy (BTLE), Bluetooth low power, or a wireless communication technology selected with sound engineering judgment without departing from the scope of the invention. By way of example and not limitation, the wireless communication used with the subject innovation can be Radio Frequency Identification (RFID), Wireless Fidelity (Wi-Fi), ZigBee, Z-Wave, Near Field Communications (NFC), WiMAX, LTE, HSPA, EV-DO, 3G, 4G, satellite, radio, cellular, Infrared (IR), among others.

The sensor 106 can include at least a light module 208, a temperature module 210, a shock module 212, a display module 214, a pressure module 215, a flow module 216, a glycol module 217, a memory 218, and a processor 220. The display module 214 can be activated by the track component 102 via the gateway device 104 to notify or alert of a condition or situation. The sensor 106 can further include a battery or a power source.

The light module 208 can include one or more components that can be configured to detect a portion of light on the container 108. The light module 208 can track light exposure and the history of such for the container 108, wherein the track component 102 can glean information on contents of the container 108 and/or how the light exposure may affect the contents of the container 108. In particular, laboratory data for a particular content of a container 108 and a type of container 108 can be studied to reveal a range of time that exposure to light impacts a quality of the particular content of the container 108. Based on the identified range, the light module 208 can communicate to the track component 102 an amount of light exposure in which such amount can be evaluated to determine if the contents of the container 108 are within the identified range. It can be appreciated that the exposure of light in time as well as the intensity of light can be measured and/or tracked by the light module 208.

The temperature module 210 can include one or more components that can be configured to detect a temperature for at least one of a contents inside the container 108, an exterior surface of the container 108, or an environment in which the container 108 is located. The temperature module 210 can include one or more sensing components to aggregate data related to the temperature and store such information prior to transmission to the gateway device 104 or other device (in direct data transfer modes discussed below). The temperature sensing components can be located in at least one of an inside of the container 108, on an exterior of the container 108, on an exterior of the container 108 but having one or more posts that penetrate inside the container 108, detached from the container 108 to gather environment temperature, detached from the container 108 but in electronic communication with the container 108 to gather environment temperature, a combination thereof, among others.

The shock module 212 can include one or more components that can be configured to detect or track an amount of impact taken (e.g., shock or force) to the container 108. A force on the container 108 can affect a quality of contents and/or a quality of the container 108. In particular, the container 108 can include a threshold for the amount of impact or force that is tolerable for the container. For example, the container 108 can have a threshold for an amount of force on the container 108 and if such threshold is met or exceeded, the container 108 can be replaced or repaired. In another example, if a force (e.g., amount and intensity) for a period of time is met, the contents of the container 108 may not be suitable for use or consumption. Such data can be communicated to the track component 102 as discussed above, and such information can be utilized to at least one of retire the container 108, repair the container 108, notify consumption or use of the container 108 should be delayed or denied, among others. It is to be appreciated that the track component 102 can leverage stress tests or other experiments on the container 108 in order to identify the threshold or thresholds for at least one of the repair, retire, or deny or delay consumption. In another embodiment, the shock module 212 can track data related to the force or impact during delivery from which the track component 102 can utilize to rank or evaluate delivery quality (e.g., gentle or rough delivery people). The track component 102 can be configured to identify which containers 108 were delivered by which people or truck and the shock module data can be correlated to such data, wherein rankings or warnings can be provided to employees.

The flow module 216 can include one or more components that can be configured to detect a measurement of flow of a line of delivery between the container 108 and a tap for dispensing the contents of the container 108. The flow module 216 can be utilized to ascertain an amount of contents dispensed from the container 108 and/or a rate of flow from the container 108. The flow module 216 can collect such data and the sensor 108 can communicate the data to the track component 102 (e.g., directly as discussed below or indirectly via the gateway device 104). Based on the received data, the track component 102 can be configured to communicate an alert or notification which would allow an adjustment to the line of delivery or a replenishment of the contents in the container 108.

The pressure module 215 can include one or more components that can be configured to measure a pressure related to the container 108 or a line for delivery between the container 108 and a tap. The pressure module 215 can detect an amount of pressure related to $CO_2$ or nitrogen or another gas. Based on a type of contents of the container 108, the pressure module 215 can include a range or a threshold of acceptable readings to which the track component 102 can receive and provide notifications or evaluation. In particular, if a threshold is met or exceeded or a reading of pressure is not in a range, the pressure module 215 can communicate to the track component 102 (e.g., directly as discussed below or indirectly via the gateway device 104), and the track component 102 can notify or alert of a repair or adjustment to the container 108 or the line for delivery. In an embodiment, if the pressure module 215 detects the pressure of the container below a predefined pressure within the line, the track component 102 can receive a reading and determine that such predefined pressure indicates a range of approved pressures in the delivery line or non-approved pressures in the delivery line.

Figure 5:
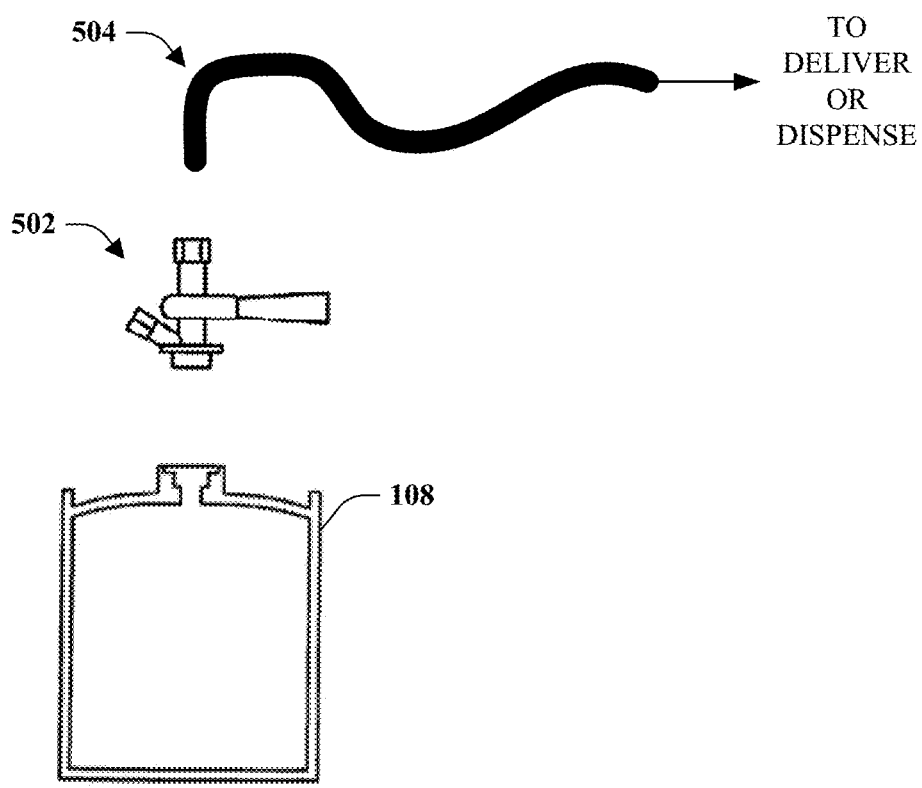
FIG. 5 is an exploded view of a container, a tap, and a line used to deliver contents of the container.

The glycol module 217 can include one or more components that can be configured to measure a parameter related to glycol in a delivery system (an example of such is shown in FIG. 5). The glycol module 217 can utilize one or more sensing components to detect at least one of a glycol temperature or a glycol amount.

In an embodiment, the glycol module 217 can include a first sensing component to detect a first glycol temperature within a reservoir, a second sensing component to detect a second glycol temperature at a location where the glycol exits the reservoir, and a third sensing component to detect a third glycol temperature at a location where the glycol returns to the reservoir. A range of variance between the first glycol temperature, the second glycol temperature, and the third glycol temperature can be five (5) degrees to seven (7) degrees Fahrenheit. In particular, the second glycol temperature can be one (1) to two (2) degrees Fahrenheit warmer than the first glycol temperature. Further, the third glycol temperature can be one (1) to eight (8) degrees Fahrenheit warmer than the first glycol temperature. It is to be appreciated that upon detection of the glycol temperature being outside the range, the glycol module 217 can communicate to the track component 102 (e.g., directly as discussed below or indirectly via the gateway device 104), and the track component 102 can notify or alert of a repair or adjustment to the container 108 or the line for delivery. By way of example and not limitation, the glycol module 217 collected data can allow the track component 102 to provide insight on an insulation of a line of delivery or the container 108, a sizing of a glycol unit for the containers 108, a number of pours within a duration of time (e.g., too many pours too quickly on a delivery system), among others. Based on the glycol temperature data collected and analyzed by the glycol module 217 and the track component 102, diagnostics can be made such as, but not limiting to, adjusting insulation, re-sizing a glycol unit, limiting or restricting high volume in short time of dispensing, limiting pressure or $CO_2$, etc.

In an embodiment, the three glycol temperatures could theoretically be the same which translates into an efficient glycol unit and system for the delivery lines. In another embodiment, the first temperature can be X degrees Fahrenheit, the second temperature can be X plus 1 degree Fahrenheit, the third temperature can be the first temperature plus 2 degrees Fahrenheit. In an inefficient system or failing system, the temperature range could widen (to 7 or 8 degrees between the first temperature and the third temperature) at which point the "outside of range" communication is performed In another embodiment, the glycol module 217 can include a sensing component to detect a ratio of glycol and water. In particular, over time a portion of water evaporates from the glycol and water mixture for a refrigerate line for the glycol unit which can result in a ratio outside a predefined or allowed threshold. Depending on the amount of water evaporating, the glycol module 217 can facilitate detecting a leak in the glycol unit or lines. By way of example and not limitation, the sensing component of the glycol module 217 can utilize a refractometry technique. The refractometry technique utilizes a light source (e.g., a laser) to shine through a clear tubing of the refrigerate lines of the glycol unit having the mixture of glycol and water mixture. A receiving source opposite of the laser receives the light source that passed through the tubing and the mixture to provide a refraction. The refraction can be used to calculate a ratio of the water to glycol to get a reading of the mixture. Upon detection and analysis of the ratio of the mixture, the glycol module 217 can communicate to the track component 102 (e.g., directly as discussed below or indirectly via the gateway device 104), and the track component 102 can notify or alert of a repair or adjustment to the refrigerate line or the glycol unit.

The display module 214 can include one or more components that can be configured to display or convey data. By way of example, the display module 214 can be an LED, a dot matrix screen, an LCD, a plasma screen, a speaker, a display, a combination thereof, among others. The display module 214 can communicate data (e.g., audibly, visually, haptic feedback, a combination thereof) related to the one or more modules of the sensor 106. For example, if the shock module 212 detects a force greater than a threshold, the display module 214 can indicate the container 108 should be rested (e.g., delayed on use) or even repaired or returned. In another example, the display module 214 can communicate an audible alarm upon approach of a threshold related to the light module 208, temperature module 210, shock module 212, $CO_2$ module 215, flow module 216, glycol module 217, among others. The display module 214 can display images, letters, color, black and white, characters, numbers, graphics, among others. The display module 214 can further communicate audibly with a speaker for example. In another embodiment, the display module 214 can output a haptic feedback. For example, if a user attempts to pick up a container 108 of which one or more modules of the sensor 106 detect an issue (e.g., or the track component 102 identifies an issue), the handles can include a vibration device that vibrates the handles to alert such user the container 108 should not be used.

In another embodiment, the sensor 106 can directly communicate data to a device (e.g., laptop, smartphone, tablet, mobile device, personal computer, portable digital assistant (PDA), a wearable device, among others). For example, the sensor 106 can include a diagnostic and/or data transfer mode in which, upon authentication, the sensor 106 can directly communicate with a device in addition to, or instead of the gateway device 104. For example, a device can be authenticated by the track component 102 by employing an authentication code that can be then communicated by the device to the track component 102. Once a device is verified and authenticated, the device can be configured to receive data from the sensor or the gateway device such as, but not limited to, the first data package or the second data package.

Figure 3:
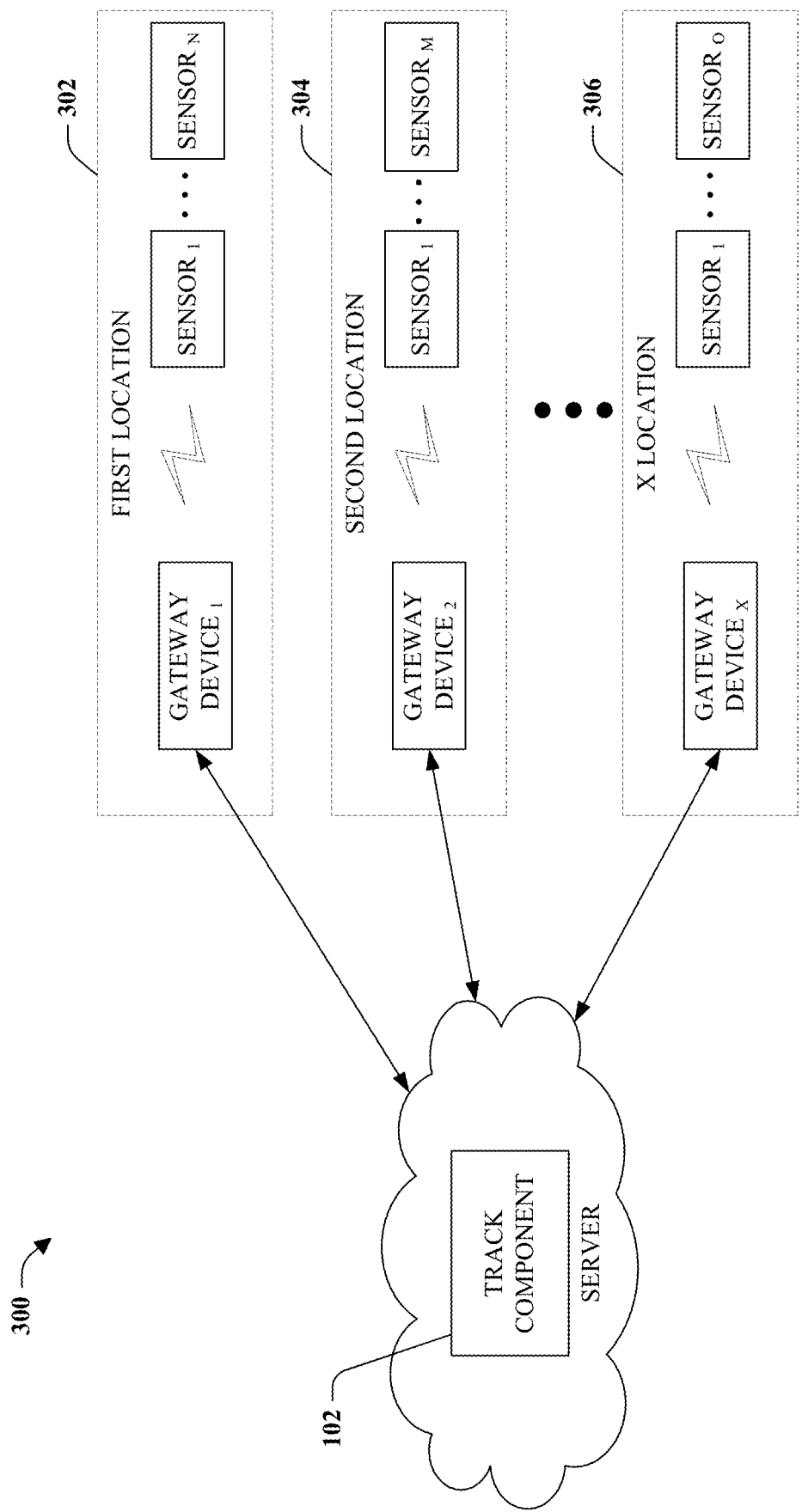
FIG. 3 is a block diagram of data communication at one or more locations in accordance with the subject innovation.

FIG. 3 illustrates a system 300 that illustrates the track component 102 receiving data from one or more locations. In particular, the track component 102 can be a server or a cloud computing platform that communicates with a number of locations, wherein each location has a one or more sensors. Moreover, each location can include one or more gateway devices.

For example, a first location 302 can include gateway device$_1$ that communicates with a number of sensors such as sensor$_1$ to sensor$_N$, where N is a positive integer. A second location 304 can include gateway device$_2$ that communicates with a number of sensors such as sensor$_1$ to sensor$_M$, where M is a positive integer. An X location 306 can include gateway device$_3$ that communicates with a number of sensors such as sensor$_1$ to sensor$_O$, where O is a positive integer. As illustrated there can be a number of locations such as the first location to the X location, where X is a positive integer. The number of sensors at each location can vary due to the number of sensors corresponding to a number of containers at each location and such number of containers is changing due to delivery, returning, or shipping. The track component 102 can receive data from each location to determine location of each container, condition of each container, and/or a condition of the contents of each container.

Figure 4:
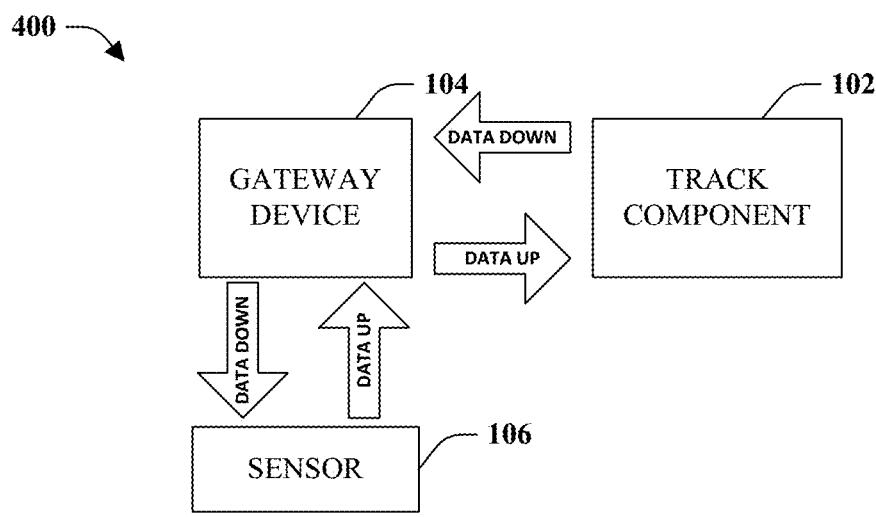
FIG. 4 is an illustration of an embodiment of data communications between one or more sensors with a gateway to a server at one or more locations.

FIG. 4 illustrates a system 400 in which data communications between the track component 102, the gateway device 104, and/or the sensor 106 to facilitate identifying a geographic location of a container and facilitate identifying a condition of the container or contents. For instance, the sensor 106 and the gateway device 104 can include a first data communications that includes data such as, but not limited to, the UUID of the sensor and data aggregated from modules of the sensor 106 (also referred to as first data package) in an upstream of data (e.g., from the sensor 106 to the gateway device 104). The gateway device 104 can further communicate an upstream of data (e.g., from the gateway device 104 to the track component 102) to the track component 102 that includes the first package of data and the UUID of the gateway device and a timestamp (also referred to as second data package).

The track component 102 can utilize a downstream of data (e.g., from the track component 102 to the gateway device 104). Between the gateway device 104 and the sensor 106 there can be a downstream of data (e.g., from the gateway device 106 to the sensor 106).

It is to be appreciated that "data up" is referenced in FIG. 4 and corresponds to "upstream of data" and "data down" is referenced in FIG. 4 and corresponds to "downstream of data."

FIG. 5 illustrates an exploded view of a delivery system that includes the container 108, a tap 502, and a line or hose 504. The tap 502 can be releaseably coupled to the container 108 and the line or hose 504 can be coupled to the tap 502, wherein the line or hose provides delivery to be dispensed. It is to be appreciated that various connectors, couplers, collars, splitters, valves, electronic valves, hoses, tubes, regulators, and the like can be used with a delivery system to which the subject innovation can be employed. As discussed above, the sensor 106 can be coupled to or integrated into the container 108, the tap 502, a coupler or collar, or a combination thereof. It is to be appreciated that the sensor 106 or a portion of the sensor 106 can be incorporated into a portion of the delivery system 500 and such incorporation can be selected by one of sound engineering judgment and/or one skilled in the art without departing from the scope of this innovation.

Figure 6:
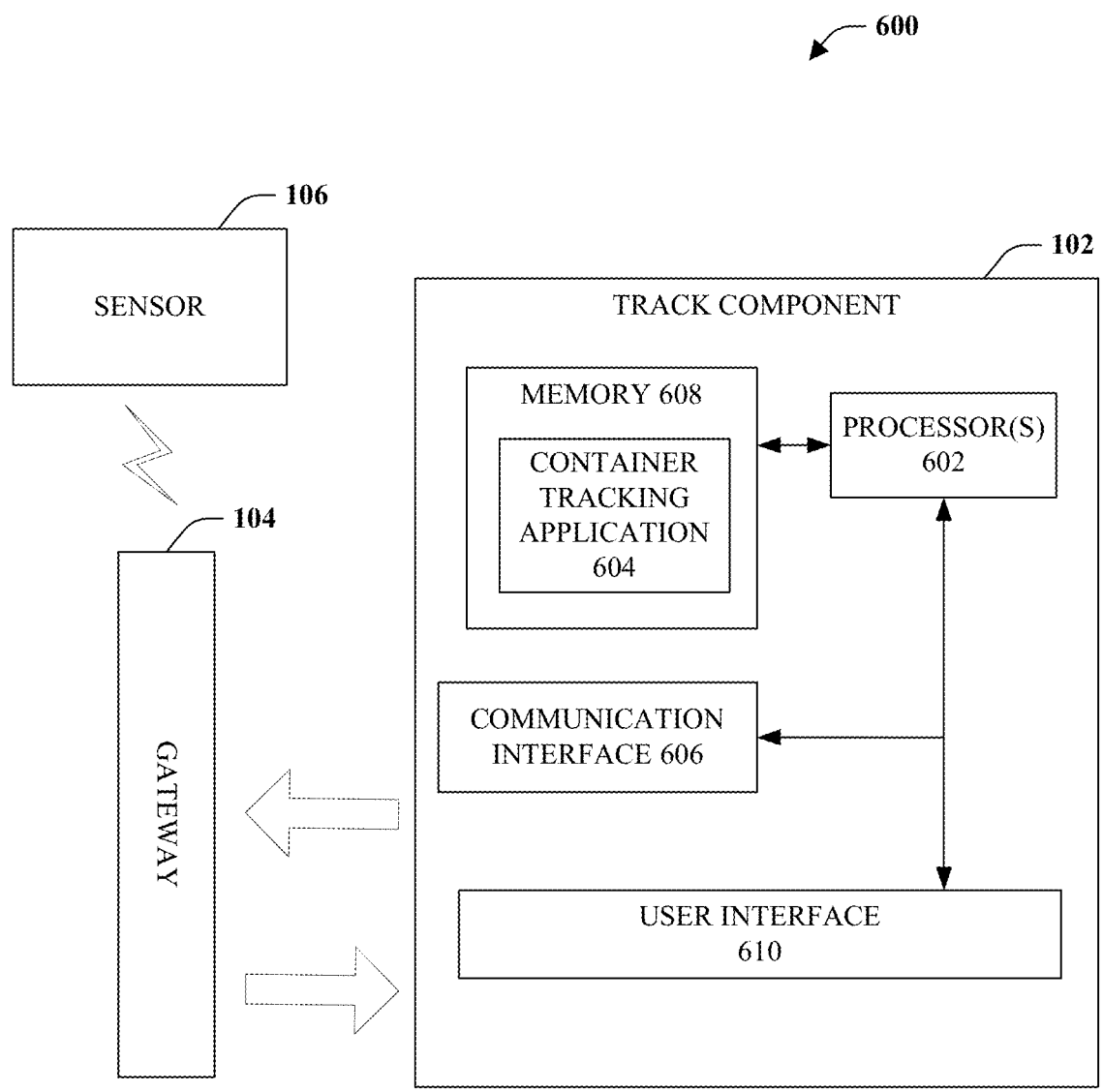
FIG. 6 is block diagram of a system that aggregates information related to a container based on data collected from a sensor.

Turning to FIG. 6, a system 600 is illustrated utilizing the track component 102. The track component 102 includes one or more processor(s) 602 configured to execute computer-executable instructions such as instructions composing container tracking application 604. Such computer-executable instructions can be stored on one or more computer-readable media including a non-transitory, computer-readable storage medium such as memory 608 of track component 102.

The track component 102 includes a communication interface 606. As shown in FIG. 6, the communication interface 606 can enable electronic communications with the gateway device 104. It is to be appreciated that the communication interface 606 can be a wired or wireless interface including, but not limited, a LAN cable, an Ethernet cable, a USB interface, a serial interface, a WiFi interface, a short-range RF interface (Bluetooth), an infrared interface, a near-field communication (NFC) interface, etc.

The track component 102 can further include a user interface 610 that comprises various elements to obtain user input and to convey user output. For instance, user interface 610 can comprise a touch display which operates as both an input device and an output device. In addition, user interface 610 can also include various buttons, switches, keys, etc. by which a user can input information to track component 102, and other displays, LED indicators, etc. by which other information can be output to the user.

In accordance with an embodiment, the track component 102 is a computing device, which can be hosted at a physical location. However, it is to be appreciated that the track component 102 can be other portable form-factors such as a laptop computer, a convertible laptop, a cell phone, a PDA, a pocket computing device, a watch computing device, or the like. Moreover, it is to be appreciated that the functionality described herein with respect to the track component 102 can be performed by a desktop computer, or other larger, less portable computing device. That is, container tracking application 604 can be installed and executed on substantially any computing device provided that such a computing device can communicate with the track component 102 as described herein.

It is to be appreciated that the track component 102 can be a network or a portion of a network, wherein the network is at least one of a website, a server, a computer, a cloud-service, a processor and memory, or a computing device connected to the Internet and connected to the gateway device 104. In general, the network can be coupled to one or more devices via wired or wireless connectivity in which data communications are enabled between the network and at least one of a second network, a subnetwork of the network, or a combination thereof. It is to be appreciated that any suitable number of networks can be used with the subject innovation and data communication on networks can be selected by one of sound engineering judgment and/or one skilled in the art.

Figure 7:
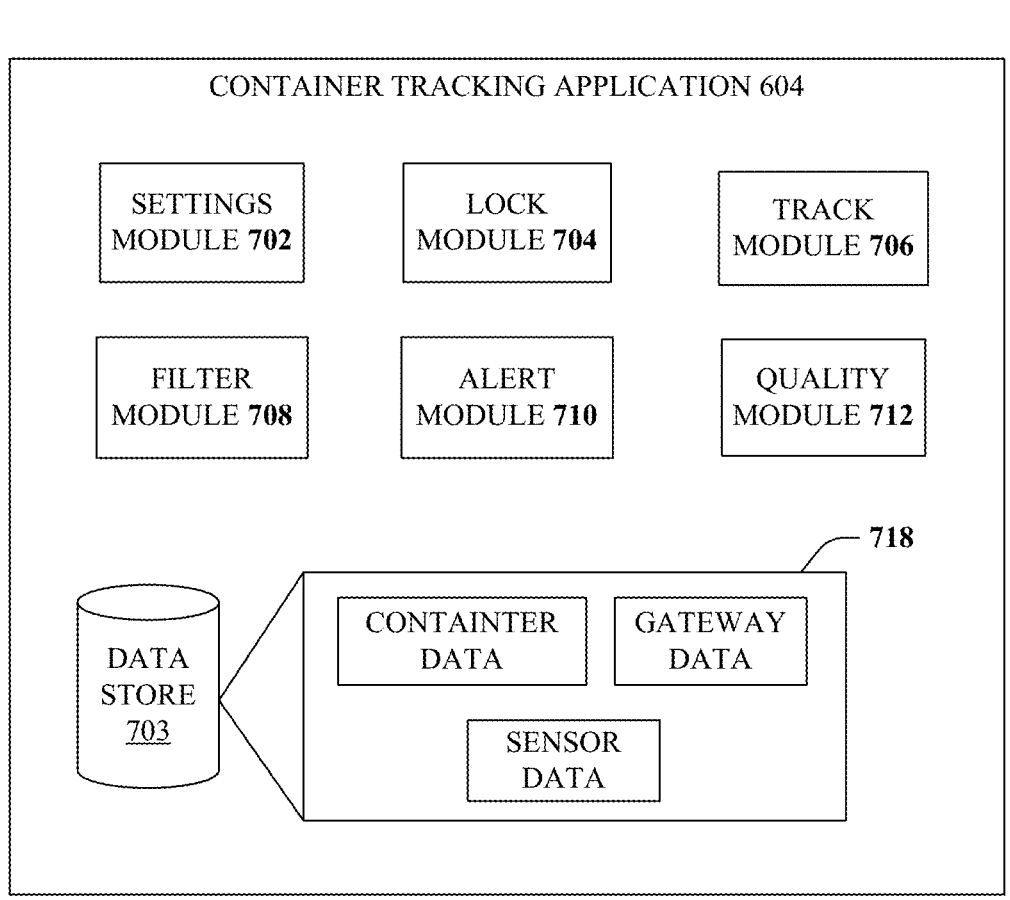
FIG. 7 is a block diagram of an exemplary, non-limiting container tracking application according to one or more aspects.

FIG. 7 illustrates a block diagram of an exemplary, non-limiting embodiment of the container tracking application 604 according to one or more aspects. The container tracking application 604 comprises computer-executable instructions and computer-readable data stored on memory 608 of the track component 102. The computer-executable instructions of container tracking application 604 are executable by processor 602 of the track component 102.

As shown in FIG. 7, the container tracking application 604 can include one or more modules (e.g., settings module 702, lock module 704, track module 706, filter module 708, alert module 710, quality module 712, among others) and data 718 stored on a data store 703 that stores data 718 (e.g., container data, gateway data, sensor data, timestamp data, among others). It is to be appreciated that container data can be, but is not limited to, data related to the condition of the container, data related to the contents of the container, data regarding the ownership or type of container data, data transmitted from a container, data transmitted to a container, among others. It is to be appreciated that gateway data can be, but is not limited to, data related to a location of the gateway device, data collected from the gateway device, data transmitted to the gateway device, among others. It is to be appreciated that the sensor data can be data collected from a sensing component or module (for example the modules described in FIG. 2), settings related to the sensor, UUID, data communicated from the sensor to the gateway device, among others. The one or more modules can include computer-executable instructions implementing various features, processes, operations, etc. of the container tracking application 604.

The settings module 702 can include one or more components that can be configured to employ one or more configurations for the container tracking application 604. The settings module 702 can be configured based upon a received instruction. In an embodiment, the settings module 702 can receive and/or allow adjustment to a range or threshold associated with the sensor 106. In another embodiment, the settings module 702 can receive instructions on notifications and/or alerts. In particular, if a range is not met for a sensor reading, an alert or notification can be defined. In another example, if a threshold is meet, then an automated response can be implemented. In still another example, the settings module 702 can be configured to enable the container tracking application 604 to send an alert or notification on a schedule or after a period of time for any data collected or tracked. It is to be appreciated that the alert or notification can be a communication (e.g., email, text, automated call, instant message, messaging service, push notification, among others) to an administrator, a restaurant, a brewery, a delivery or shipping service, a customer, a purchaser, owner of a container, manufacturer of a container, third-party servicing a container, third-party servicing a delivery system, a combination thereof.

The lock module 704 can include one or more components that can be configured to allow or deny flow of contents from the container 108 based on a detected parameter or a received instruction. In an embodiment, a user can communicate an instruction to deny delivery of contents from the container 108 via a valve. The lock module 702 can communicate with a solenoid valve or smart valve that denies or allows flow of contents. By way of example and not limitation, the flow of contents can be denied, allowed, or restricted based evaluation of data collected from the sensor 106, a user generated instruction, a threshold or range being met or not met for a parameter detected by the sensor 106, a combination thereof, among others. In an example, a lock component (discussed in FIG. 9) can be in electrical communication with a gateway device, wherein the gateway device can communicate instructions to open or close the lock component. The gateway device in such example can receive instructions from the container tracking application 604, the track component 102, and/or a device (via direct communications as discussed).

The track module 706 can include one or more components that can be configured to track data related to at least one of the sensor 106, the container 108, the gateway device 104, a geographic location, data collected by the sensor 106 or the gateway device 104, a combination thereof, among others. The track module 706 can evaluate the second data package and aggregate such information to track one or more containers 108. Based upon the gateway device 104 communicating sensor collected data, geographic information, time stamp data, among others (e.g., the second package data), a location and time line for one or more containers can be constructed by the track module 706. In addition, data collected by the sensor 106 can be leveraged and incorporated to glean a lifecycle of a container in which the lifecycle shows at least one of a time of departure from a brewery, in route or out for delivery, at distributor, out for delivery to customer, at customer, return to distributor, waiting to be returned to distributor, returning to brewery, among others. The track module 706 can further provide data on how long a container 108 is situated or stayed in a certain geographic location or stage of a lifecycle.

For example, during tracking by the track module 706, a visualized timeline can indicate a location (e.g., brewery, manufacturer, out for delivery, distributor or middle person, out to delivery to customer or end user, at customer or end user, returning to distributor or middle person, at distributor or middle person waiting to return to brewery, return to brewery or manufacture, among others) of the container 108 with additional information related to the container 108 such as, but not limited to dirty, clean, in need for repair, filled, marked for distribution, marked and ready for delivery, not marked for distribution, holding and not marked for customer, marked and ready to deliver to customer, in storage and not tapped, on tap, empty, empty and ready to return to distributor or brewery, damaged, request inspection, among others.

In an embodiment, the track module 706 can identify a last known location of the container 108 based on evaluation of the time stamp and UUID of the container from the latest transmission of receipt of data from a gateway, device, or track component 102. In another embodiment, the track module 706 can include a query feature in which a query based on time, location, container data, gateway information, data related to sensor, data related to a refrigerator, data related to a content of the container, etc. can be leveraged. For example, a query of "containers that the device or gateway device or track component has not received data from or on" can be fulfilled and results can be generated based on the aggregated data from the container tracking application 604 and, in particular, the track module 706.

In an embodiment, the track module 706 can aggregate historical data related to the data stored in the data store 703 such as, but not limited to, time, location, container data, gateway information, data related to sensor, data related to a refrigerator, data related to a content of the container, among others. For example, the track module 706 can provide historical data or averaged data for all locations, a subset of locations, or a specific location. This can include, as an example, average time for a container having specific contents at a certain customer as well as content usage by style or types of contents in a defined time frame.

It is to be appreciated that the track module 706 can include a plug-in component that is configured to receive and/or transmit data with another component or application. The another component or application can be a device (e.g., the device that is described above that can directly interact with one or more of the track component, the gateway device, or the sensor 106), an application that can track signatures and proof of delivery, applications that can enumerate containers for loading for shipping or delivery, applications that can enumerate containers for unloading for shipping or delivery, applications that identify location of a container during transit, applications that can identify a location of a container to be in a shipping transit or should be in shipping transit and are not, applications that allow input or feedback from an end user or distributor, applications that allow receipt of payment for a container or a repair of a container, applications that track inventory, among others.

The filter module 708 can include one or more components that can be configured to filter, query, sort, and manipulate data stored in the data store 703. The filter module 708 can utilize data tags, meta data, sorting techniques, among others to allow querying of data as well as delivering query results to queries directly received or indirectly received from user or machine. In an embodiment, the filter module 708 can aggregate data related to a lifecycle of one or more containers and display such data as a visualized lifecycle, wherein such lifecycle can further be drilled down or searched and/or visualized. In another embodiment, containers can be visualized to illustrate what containers are in which stage for a duration of time or a particular location. The filter module 708 can further allow querying based on a content of the container 108 based on at least the type of contents, expiration date, ABV, IBU, name, brand, category of beer, style of contents, brewed date of contents, shipping date of contents, delivery date of contents, among others. For instance, the filter module 708 can be configured to sort based on available containers in distribution that have an expiration date that is further away so such containers can be shipped to customers or end users. In another embodiment, the filter module 708 can be configured to identify a listing or visual representation of where containers are located that have expired contents.

The filter module 708 can be configured to generate query results based on a query received related to a container 108 that had contents that did not meet quality requirements or standards. In other words, the filter module 708 can generate query results of containers that originated from a batch or brewing of the contents (e.g., discussed above regarding the sensor 106 being written with data related to filling information). The filter module 708 can facilitate identifying containers for a recall or safety issue.

The alert module 710 can include one or more components that can be configured to communicate data or notifications. The alert module 710 can communicate data or notifications (e.g., visual alert, auditory alert, haptic feedback, a combination thereof). The alert module 710 can communicate a text, a cellular call, a message, a picture message, a group message, an email, an audible signal, a haptic feedback, a light, a post on a social media page, a post on a website, a communication of data to a device or a wearable device, an image, a portion of a graphic, a symbol, a character, a letter, a word, a combination thereof. The alert module 710 can be configured to communicate data based on a threshold or trigger corresponding to a sensor 106 data collected. In another embodiment, the alert module 710 can be configured to communicate data based on an electronic instruction from the track component 102, the container tracking application 604, or a device (in direct communication based on authentication).

In an embodiment, the alert module 710 can be configured to communicate a notification upon at least one of a detection of an empty or near empty container 108, a pickup request, a delivery request, a payment due date, an expiration date, a force detected on container amount, an amount of light exposure, a temperature, a glycol reading, a glycol ratio, an amount in a container, a flow rate, a pressure, a temperature change, among others. In an embodiment, such notifications can include geographic location data.

Although a single data store 703 is illustrated, any suitable number of data stores can be used with the system 700. The number of data stores and the organization where the data is stored there on can be selected with sound engineering judgment and/or by one skilled in the art without departing from the scope of the subject innovation.

It is to be appreciated that any component or module from the container tracking application 604 can be a stand-alone component/module, a sub-component, a sub-module, an integrated component with another component, an integrated module within another module, a system, a portion of a system described herein and/or a combination thereof. Thus, the functionality described for the container tracking application 604 can be performed by any number of the components or modules discussed.

Figure 8:
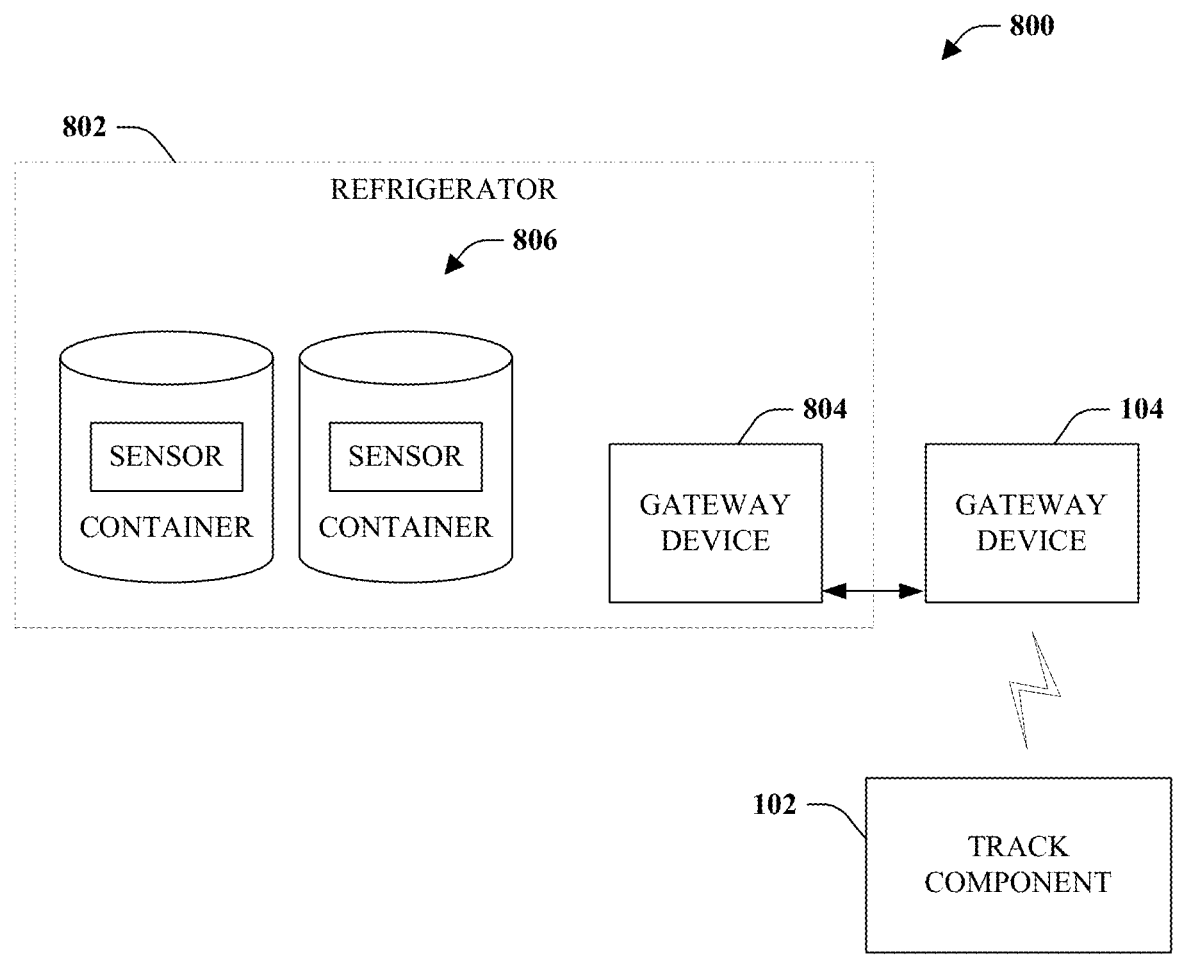
FIG. 8 is a block diagram of a gateway device configuration used to collect data from sensors on a container as well as a refrigerator.

FIG. 8 illustrates a refrigerator 802 that can house one or more containers 806 with respective sensors coupled thereto. The refrigerator 802 can be fabricated of metal and surround the containers 806 as well as any electronic or electrical devices therein. Accordingly, wireless communications will not transmit through the refrigerator 802. The system 800 illustrates an additional gateway device 804 that is inside the refrigerator 802 that collects data from the sensor(s). The additional gateway device 804 is then hardwired to the gateway device 104 outside the refrigerator 802, wherein the gateway device 104 is capable of communicating wirelessly to the track component 102.

The system 800 can further be utilized to identify conditions within the refrigerator 802 based on the sensor collecting information such as light conditions, shock or impact, temperature conditions, among others. Based on the collected data within the refrigerator 802, the track component 102 can identify parameters related to the refrigerator 802 as well as the containers 806. For example, the system 800 can include a first sensor that is configured to detect temperature of the container and a second sensor that is configured to detect temperature of the refrigerator environment within the refrigerator 802. Such data from the first sensor and the second sensor can be communicated from gateway device 804 to gateway device 104 based upon a received instruction from the track component 102 or a predefined amount of time or a schedule for transmission of data.

In another embodiment, the system 800 can further be utilized to identify an energy consumption of the refrigerator 802 or components thereof. In still another embodiment, the system 800 can monitor an operational status of the refrigerator 802 or components thereof.

Figure 9:
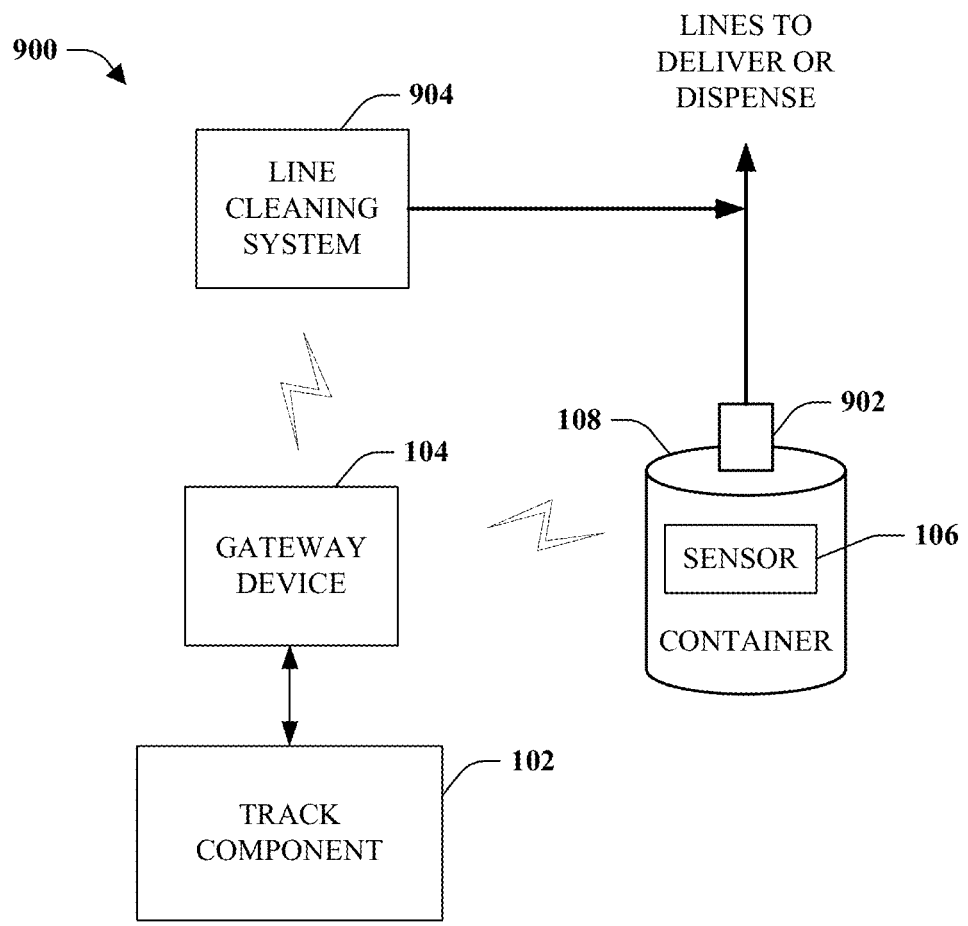
FIG. 9 is a block diagram of a system that allows activation of a cleaning system based on data collected from a sensor.

Turning to FIG. 9, the container 108 can include a lock component 902 that is configured to de-activate and/or activate the container 108 or a component used to allow flow of material from the container 108. The lock component 902 can receive a signal from at least one of the gateway device 104, the sensor 106, or the track component 102 to de-activate or activate the container 108. The lock component 902 employs security techniques and features to the container 108 in order to restrict at least an operation or a portion of an operation or functionality of the container 108.

In an embodiment, the lock component 902 can be configured to receive one or more electronic signals and based on receipt or non-receipt of the one or more electronic signals the flow of contents from the container 108 can be controlled. In particular, de-activation of the flow can be based upon whether an electronic signal is received. For example, if the electronic signal is received, the lock component 902 can allow flow of contents from the container 108. In another example, the lock component 902 can prevent flow or access to contents of the container 108 if the electronic signal is not received or detected by the lock component 902.

Moreover, a line cleaning system 904 can be activated by at least one of the track component 102, the gateway device 104, or the sensor 106. The information gleaned from the sensor(s) on container(s) can be utilized to determine whether or not to perform a cleaning of lines used with a delivery or a dispense. The line cleaning system 904 can be activated if data from one or more sensors provides data that indicates the lines should be cleaned.

Figure 10:
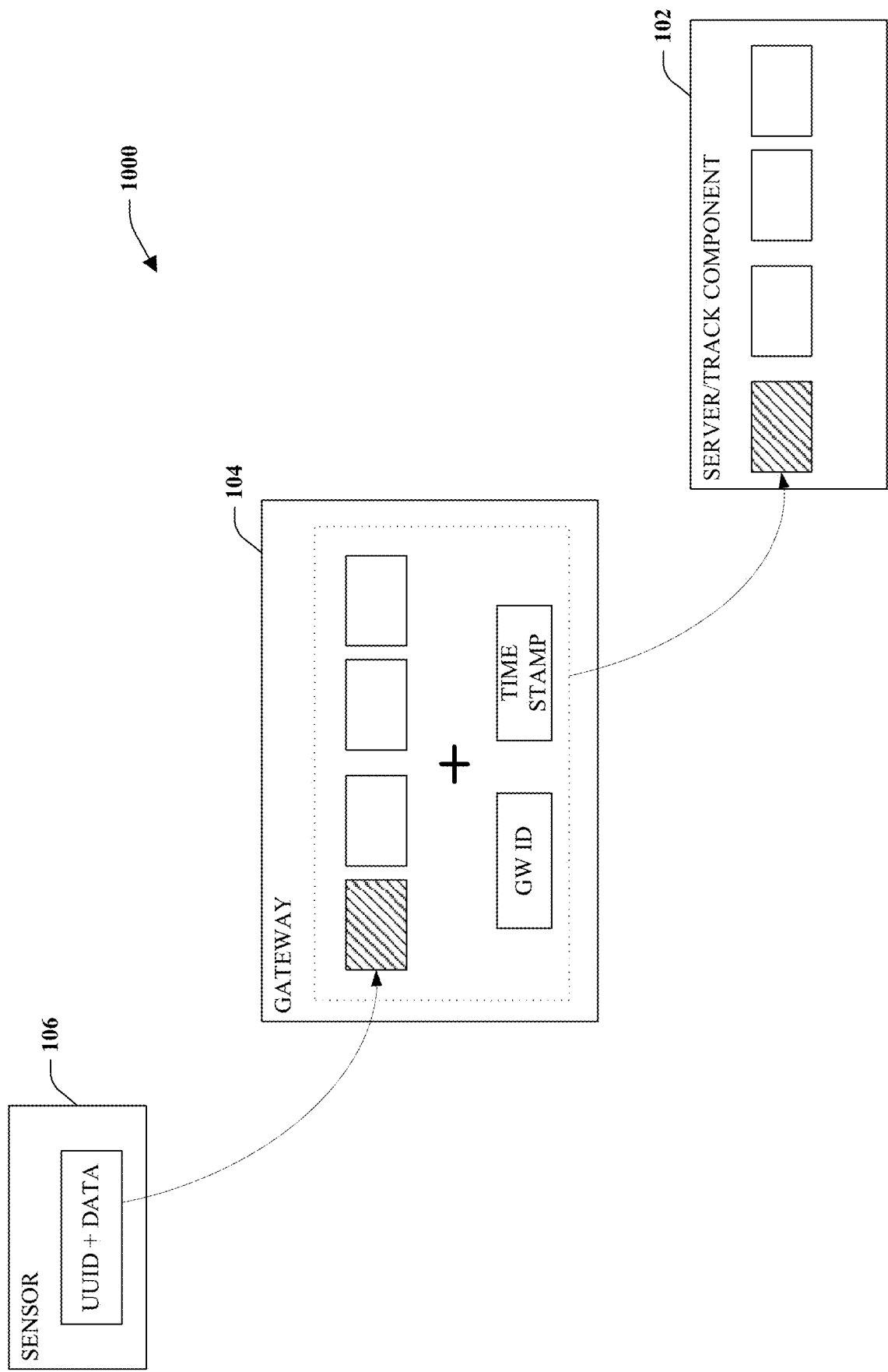
FIG. 10 is a block diagram representing data aggregation in accordance with the subject innovation.

FIG. 10 illustrates data being handled by the track component 102 (also can be referred to as a server), the gateway device 104, and the sensor 106. As illustrated, data from the sensor 106 includes Universal Unique Identification (UUID) and data (e.g., data collected from the sensor such as, but not limited to, light data, shock data, temperature data, flow data, among others). The UUID and data is communicated to the gateway device 104 when in a range based on use of Bluetooth® low energy communication. In an embodiment, the communication from the sensor 106 to the gateway 104 is based on a time duration which can be adjusted to manage battery life of the sensor 106. The data communicated from the sensor 106 to the gateway device 104 can also be referred to as a first data package. The gateway device 104 can be configured to collect UUID and data from one or more sensors and include to the data a GW ID (gateway identification) and a time stamp. This data is communicated from the gateway device 104 to the track component 102 (also referred to as a server). The data communicated from the gateway device 104 to the track component 102 can also be referred to as a second data package. The track component 102 can utilize the collected data to analyze and provide insight on the container 108, the environment of the container 108, the contents of the container, the delivery or shipping of the container, the location of the container, light exposure to the container 108, shock or impact to the container 108, temperature of the container 108, among others.

The aforementioned systems, modules, components, (e.g., track component 102, gateway device 104, sensor 106, container 108, container tracking application 604, among others), and the like have been described with respect to interaction between several components, modules, and/or elements. It should be appreciated that such devices and elements can include those elements or sub-elements specified therein, some of the specified elements or sub-elements, and/or additional elements. Further yet, one or more elements and/or sub-elements may be combined into a single component or module to provide aggregate functionality. The elements may also interact with one or more other elements not specifically described herein.

As used herein, the terms "component," "module," and "system," as well as forms thereof are intended to refer to a computer-related entity, either hardware, a combination of hardware and software, software, or software in execution. For example, a component or module may be, but is not limited to being, a process running on a processor, a processor, an object, an instance, an executable, a thread of execution, a program, and/or a computer. By way of illustration, both an application running on a computer and the computer can be a component or a module. One or more components may reside within a process and/or thread of execution and a component may be localized on one computer and/or distributed between two or more computers. One or more modules may reside within a process and/or thread of execution and a module may be localized on one computer and/or distributed between two or more computers. It is to be appreciated that one or more processors can be utilized with the subject innovation.

It is to be appreciated that an "application" can include one or more modules that perform one or more functionalities via instructions stored on a memory executed by a processor. Moreover, although a module and functionality may be described as a single module, it is to be appreciated that modules and respective functionalities can be combined into two or more modules. Additionally, one or more applications can be provided to include the one or more modules described herein. For example, the container tracking application 604 can be comprised of one or more applications that perform the functionalities described herein, wherein the one or more applications include one or more of the modules described herein.

It is to be appreciated that the "application" (here, the track component 102, gateway device 104, among others) can be hosted in a cloud, on a mobile device, on a server, on a computing device (e.g., computer, container tracking application 604, track component 102, and the like), and/or a combination thereof. Moreover, although a single processor and/or memory is illustrated, it is to be appreciated that one or more processors and/or one or more memory can be employed with the subject innovation.

In an embodiment, system, can include: a container having a top, a bottom opposite the top, a sidewall in between the top and the bottom, the container configured to hold a volume under a pressure; a delivery line coupled to an opening in the container that conveys the volume to a tap for dispensing of the volume; a sensor coupled to the container, the sensor tracks a temperature of the container, an amount of force taken by the container, and a light exposure to the container; a gateway device that wirelessly receives data from the sensor based on the sensor coming within a predefined distance of the gateway device, upon coming within the predefined distance, the sensor communicates a first data package that includes the temperature, the amount of impact, the light exposure and an identification of the sensor; the gateway device creates a second data package that includes a time stamp of when the first data package was communicated, an identification of the gateway device, and the first data package; and a track component that is configured to: receive of the second data package; evaluate of the time stamp from the gateway device and the identification of the gateway; identify of a geographic location of the gateway device and the sensor coupled to the container based upon comparing the identification of the gateway device to a collection of geographic locations having gateway devices each with a respective identification; monitor the temperature, the amount of force, and the light exposure for the container at the geographic location; communicate data to the sensor via the gateway device or to the gateway device; and communicate a notification if at least one of the temperature, the amount of force, or the light exposure exceeds a predefined threshold.

The embodiment can further include a glycol unit that refrigerates a portion of the delivery line. The sensor can further include one or more components that are configured to detect a temperature of glycol from a glycol unit that refrigerates a portion of the delivery line. The sensor further includes a first sensing component configured to detect a first glycol temperature within a reservoir of the glycol unit; a second sensing component configured to detect a second glycol temperature at a location where the glycol exits the reservoir; a third sensing component to detect a third glycol temperature at a location where the glycol returns to the reservoir; and the gateway device communicates the first glycol temperature, the second glycol temperature, and third glycol temperature to the track component via the second data package. In the embodiment the track component can further be configured to communicate a notification if a range of variance between the first glycol temperature, the second glycol temperature, and the third glycol temperature is between five (5) degrees to seven (7) degrees Fahrenheit. In the embodiment, the notification relates to a request for an inspection of the delivery line or a repair of the delivery line.

In an embodiment, the sensor can include one or more components to detect a weight of the container or a flow of contents leaving the container and the gateway device communicates the weight and the flow to the track component via the second data package. In the embodiment, the track component is further configured to communicate a notification if the weight of the container is detected below a predefined weight or the flow of contents leaving the container is detected to be within a predefined range, wherein the predefined weight or the predefined range indicate the container is empty or the container is proximately empty. In the embodiment, the notification relates to a request for at least one of a reorder of a contents in the container, an automated request to replace the contents of the container with a full container, a scheduled return date for the container, a scheduled pickup for the container, or an inquiry whether a purchase is desired.

In an embodiment, a sensing component can detect a ratio of glycol and water and the gateway device communicates the ratio to the track component via the second data package. In the embodiment, the sensing component further includes: a light source to shine a light through a clear tubing of a clear tubing for a glycol refrigerate unit, the clear tubing having the mixture of glycol and water mixture; a receiving source opposite of the light source that receives the light that passed through the clear tubing and the mixture to provide a refraction; the refraction is used to calculate a ratio of the water to glycol to get a reading of the mixture. In the embodiment, the track component communicates a notification related to a repair or adjustment to the line or the glycol unit.

In an embodiment, an additional gateway device can is configured to create a third data package that includes a time stamp of when the second data package was communicated, an identification of the additional gateway device, the second data package, and the first data package; a track component that is configured to perform: receipt of the third data package; and evaluation of the data contained with the third data package.

In an embodiment, a refrigerator system is provided that includes: one or more containers housed within a refrigerator environment; each container having a top, a bottom opposite the top, a sidewall in between the top and the bottom, the container configured to hold a content in a volume under a pressure; a first sensor coupled to the container, the first sensor tracks a temperature of the container; a second sensor located within the refrigerator environment, the sensor tracks a temperature of the refrigerator environment; a first gateway device that is located within the refrigerator environment and hardwired to a second gateway device that is located outside the refrigerator environment, the first gateway device receives data from at least one of the first sensor or the second sensor in response to an electronic instruction, the at least one of the first sensor or the second sensor communicates a first data package that includes at least one of the temperature of the container or the temperature of the refrigerator environment; the first gateway device communicates the first data package to the second gateway device via the hardwired connection; the second gateway device creates a second data package that includes a time stamp of when the first data package was communicated, an identification of the gateway device, and the first data package; and a track component that is configured to: communicate the electronic instruction to the first gateway device via the second gateway device; communicate data to the sensor via the second gateway device and the first gateway device; receive the second data package; evaluate of the time stamp from the second gateway device and the identification of the gateway device; identify of a geographic location of the second gateway device and the sensor coupled to the container based upon comparing the identification of the gateway device to a collection of geographic locations having gateway devices each with a respective identification; monitor the temperature of the container and the temperature of the refrigerator environment at the geographic location; and communicate a notification if at least one of the temperature of the container or the temperature of the refrigerator environment is outside a predefined range or threshold.

In the embodiment, the refrigerator system further includes: a sensor coupled to the container, the sensor tracks a temperature of the container, an amount of force taken by the container, and a light exposure to the container; a sensing component to detect a ratio of glycol and water and the gateway device communicates the ratio to the track component via the second data package; a sensor configured to detect a temperature of glycol from a glycol unit that refrigerates a portion of the delivery line; and the gateway device communicates the temperature, the amount of force, the light exposure, the ratio, and the temperature of glycol to the track component via the second data package.

The embodiment can include a sensor that includes one or more components to detect a weight of the container or a flow of contents leaving the container and the gateway device communicates the weight and the flow to the track component via the second data package. The embodiment can include an instruction that is communicated to purchase an additional container to replace the container that is identified by the track component as empty due to the flow or the weight detected by the sensor. The embodiment can include a portion of data stored on a memory of the sensor, wherein the portion data is a batch date for the content of the container, a geographic location of where the content was made, a name of a person involved in the making of the content of the container, or a time when the container is filled. The embodiment can include a device that is configured to communicate directly with at least one of the sensor or the gateway device to receive the first data package or the second data package respectively based upon the device communicating an authentication code that is verified by the track component.

In an embodiment, a system is provided that includes: a container having a top, a bottom opposite the top, a sidewall in between the top and the bottom, the container configured to hold a volume under a pressure; a delivery line coupled to an opening in the container that conveys the volume to a tap for dispensing of the volume; a glycol unit that refrigerates a portion of the delivery line; a sensor coupled to the container, the sensor tracks a temperature of the container, an amount of force taken by the container, and a light exposure to the container; a first sensing component configured to detect a first glycol temperature within a reservoir of the glycol unit; a second sensing component configured to detect a second glycol temperature at a location where the glycol exits the reservoir; and a third sensing component to detect a third glycol temperature at a location where the glycol returns to the reservoir; a gateway device that wirelessly receives data from the sensor based on the sensor coming within a predefined distance of the gateway device, upon coming within the predefined distance, the sensor communicates a first data package that includes the temperature, the amount of impact, the light exposure and an identification of the sensor; the gateway device creates a second data package that includes a time stamp of when the first data package was communicated, an identification of the gateway device, and the first data package; a track component that receives the second data package and identifies a geographic location of the container and the temperature, the amount of force, the first glycol temperature, the second glycol temperature, the third glycol temperature, and the light exposure for at least one container; a device that is configured to communicate directly with at least one of the sensor or the gateway device to receive the first data package or the second data package respectively based upon the device communicating an authentication code that is verified by the track component; and the track component communicate a notification based on contents of the second data package and reference to a predefined threshold related to at least one of a temperature, an amount of force, a first glycol temperature, a second glycol temperature, a third glycol temperature, and a light exposure for the container.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 11:
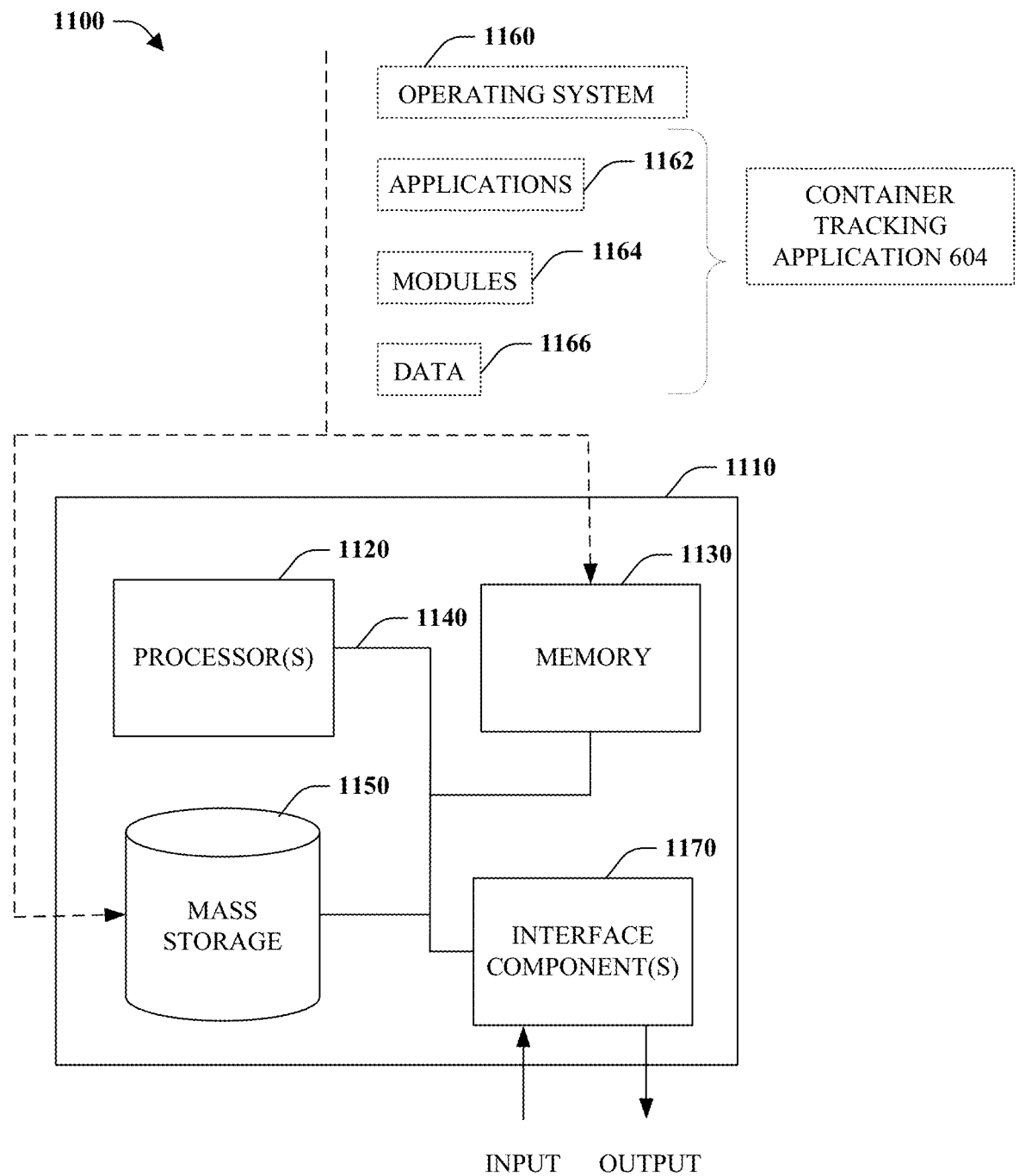
FIG. 11 is a schematic block diagram illustrating a suitable operating environment for aspects of the subject disclosure.

In order to provide a context for the claimed subject matter, FIG. 11 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), portable gaming device, smartphone, a wearable device, tablet, Wi-Fi device, laptop, phone, among others), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 11, illustrated is an example general-purpose computer 1110 or computing device (e.g., desktop, laptop, server, hand-held, programmable consumer or industrial electronics, set-top box, game system . . . ). The computer 1110 includes one or more processor(s) 1120, memory 1130, system bus 1140, mass storage 1150, and one or more interface components 1170. The system bus 1140 communicatively couples at least the above system components. However, it is to be appreciated that in its simplest form the computer 1110 can include one or more processors 1120 coupled to memory 1130 that execute various computer executable actions, instructions, and or components stored in memory 1130.

The processor(s) 1120 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1120 may also be implemented as a combination of computing devices, for example a combination of a DSP and a microprocessor, a plurality of microprocessors, multi-core processors, one or more microprocessors in conjunction with a DSP core, or any other such configuration.

The computer 1110 can include or otherwise interact with a variety of computer-readable media to facilitate control of the computer 1110 to implement one or more aspects of the claimed subject matter. The computer-readable media can be any available media that can be accessed by the computer 1110 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 1110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1130 and mass storage 1150 are examples of computer-readable storage media. Depending on the exact configuration and type of computing device, memory 1130 may be volatile (e.g., RAM), non-volatile (e.g., ROM, flash memory . . . ) or some combination of the two. By way of example, the basic input/output system (BIOS), including basic routines to transfer information between elements within the computer 1110, such as during start-up, can be stored in nonvolatile memory, while volatile memory can act as external cache memory to facilitate processing by the processor(s) 1120, among other things.

Mass storage 1150 includes removable/non-removable, volatile/non-volatile computer storage media for storage of large amounts of data relative to the memory 1130. For example, mass storage 1150 includes, but is not limited to, one or more devices such as a magnetic or optical disk drive, floppy disk drive, flash memory, solid-state drive, or memory stick.

Memory 1130 and mass storage 1150 can include, or have stored therein, operating system 1160, one or more applications 1162, one or more program modules 1164, and data 1166. The operating system 1160 acts to control and allocate resources of the computer 1110. Applications 1162 include one or both of system and application software and can exploit management of resources by the operating system 1160 through program modules 1164 and data 1166 stored in memory 1130 and/or mass storage 1150 to perform one or more actions. Accordingly, applications 1162 can turn a general-purpose computer 1110 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the container tracking application 604 (associated functionality, modules, and/or portions thereof) can be, or form part, of an application 1162, and include one or more modules 1164 and data 1166 stored in memory and/or mass storage 1150 whose functionality can be realized when executed by one or more processor(s) 1120. Moreover, it is to be appreciated that the software, firmware, or combination thereof to perform the functionality of the described components herein can be downloaded, installed, or a combination thereof from any host. For instance, the host can be an online store, a website, an IP address, an application store, a network, a storage medium, a portable hard disk, a server, or the Internet.

In accordance with one particular embodiment, the processor(s) 1120 can correspond to a system on a chip (SOC) or like architecture including, or in other words integrating, both hardware and software on a single integrated circuit substrate. Here, the processor(s) 1120 can include one or more processors as well as memory at least similar to processor(s) 1120 and memory 1130, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the container tracking application 604 (associated functionality, modules, and/or portions thereof) can be embedded within hardware in a SOC architecture.

The computer 1110 also includes one or more interface components 1170 that are communicatively coupled to the system bus 1140 and facilitate interaction with the computer 1110. By way of example, the interface component 1170 can be a port (e.g. serial, parallel, PCMCIA, USB, FireWire . . . ) or an interface card (e.g., sound, video . . . ) or the like. In one example implementation, the interface component 1170 can be embodied as a user input/output interface to enable a user to enter commands and information into the computer 1110 through one or more input devices (e.g., pointing device such as a mouse, trackball, stylus, touch pad, keyboard, microphone, joystick, game pad, satellite dish, scanner, camera, other computer . . . ). In another example implementation, the interface component 1170 can be embodied as an output peripheral interface to supply output to displays (e.g., CRT, LCD, plasma . . . ), speakers, printers, and/or other computers, among other things. Still further yet, the interface component 1170 can be embodied as a network interface to enable communication with other computing devices (not shown), such as over a wired or wireless communications link.

Figure 12:
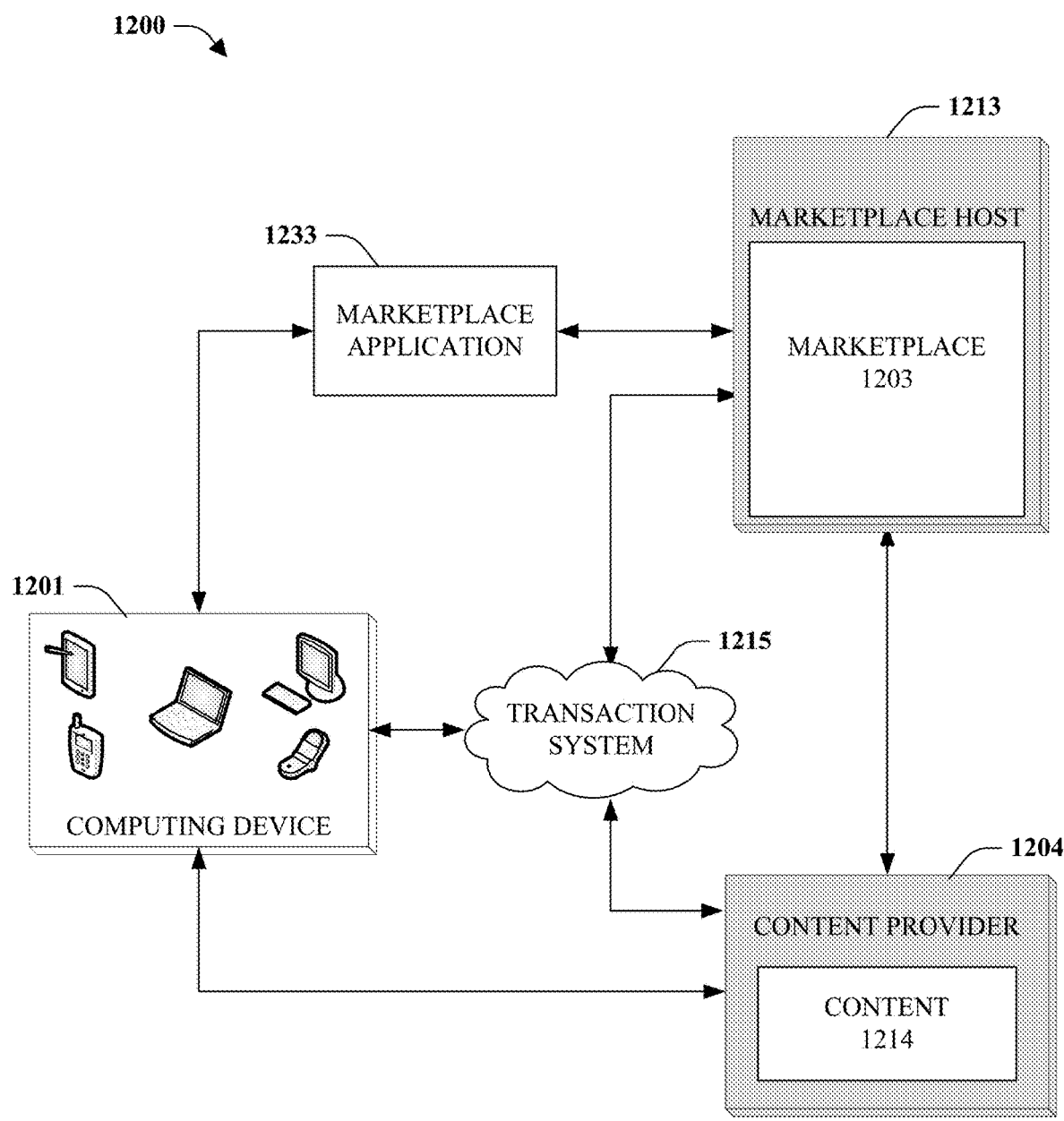
FIG. 12 is a schematic block diagram illustrating a suitable environment for delivery of data in accordance with the subject disclosure.

FIG. 12 illustrates an operating environment 1200 that can be used with the subject innovation and in particular, the container tracking application 604. The operating environment 1200 includes a computing device 1201 (e.g., device smartphone, a tablet, a laptop, a desktop machine, a portable gaming device, a device with Internet connectivity, a wearable device, among others), a user, a marketplace 103, a content provider 1204, and content 1214. The operating environment 1200 is configured to deliver data (e.g., content 1214) to the computing device 1201 based upon a request from the computing device 1201 (e.g., typically initiated by a user of the computing device 1201). However, it may be appreciated that the delivery of data to the computing device 1201 can be pushed to the computing device 1201 and further approved (e.g. acceptance of license agreement, among others) by the user. The data delivered can be from a content provider 1204, wherein the data can be delivered directly to the computing device 1201 or indirectly delivered to the computing device 1201 via the marketplace 1203 and/or the marketplace applications 1233. In an embodiment, the computing device 1201 can utilize a transaction system 1215 that facilitates purchasing data via at least one of the marketplace 1203, the marketplace applications 1233, the content provider 1204, and the like. The transaction system 1215 can be configured to utilize a charging gateway to facilitate completing a transaction between entities (e.g., user, content provider, marketplace, among others).

The computing device 1201 and the marketplace 1203 can be configured to communicate across a network, for example, wherein the marketplace 1203 is accessed via the marketplace application 1233 or a user interface (UI) associated with one of the marketplace 1203 or the marketplace host 1213. The marketplace 1203 can be hosted by a marketplace host 1213 associated with any suitable host, server, computer, data store, and the like.

In one embodiment, the computing device 1201 is mobile so that it may function for a period of time without requiring a physical connection to a power source or network provider. For example, a cellular network or a Wi-Fi connection can be used by the computing device 1201 in order to transmit and/or receive data within the operating environment 1200.

A user can employ the computing device 1201 for the device's intended functions as well as communicating data with the marketplace 1203 and/or marketplace host 1213. Commonly, the user purchases content 1214 and/or products from the content provider 1204 via the transaction system 1215. It is to be appreciated that the marketplace 1203 can be in an electronic form such as a website, the marketplace application 1233, or an executable program. In a preferred embodiment, the marketplace 1203 takes the form of the marketplace application 1233 configured to run on the user's computing device 1201. The marketplace application 1233 may be utilized to install the content 1214 from the content provider 1204 onto the computing device 1201.

The marketplace 1203 can further connect the content provider 1204 and/or the content 1214 of the content provider 1204 with the computing device 1201 to allow the user to receive content 1214 via a download (e.g., communication of data packets). The marketplace 1203 can offer the user a variety of content 1214 for purchase (via the transaction system 115) or for free of charge. The content 1214 offered by the marketplace 1203 may also come from the marketplace host 1213. For example, the content provider 1204 can have a website for direct delivery of content 1214 or have content 1214 hosted in the marketplace 1203 by the marketplace host 1213. Thus, in such an example, a user can directly receive data or content from the website of the content provider 1204 or use the marketplace application 1233 to identify the content 1214 for receipt through the marketplace 1203. Moreover, the content 1214 can be tailored to the computing device 1201. For instance, a first content can be built for a first computing device having a first operating system and a second content can be built for a second computing device having a second operating system, wherein the first content and the second content can be from the content provider 1204.

In some embodiments, the system 1200 utilizes the transaction system 1215. The transaction system 1215 can include a transaction gateway that facilitates transactions between at least the marketplace host 1213, one or more users, the marketplace 1203, and/or the content provider 1204. When the user purchases content 1214 from the marketplace 1203 or content provider 1204, a charging gateway can receive a request to apply a charge to a user account (e.g., a monetary value via an electronic transaction via an account) owned or authorized by the user. For example, the user account can be, but is not limited to being, a credit card account, an account with the content provider 1204 or marketplace host 1213, a bank account, a debit account, an e-commerce account (e.g. Pay-Pal®), an electronic account, a savings account, and the like.

The transaction gateway can store transaction data (e.g., user account, username, password, data related to the user, data related to the computing device 1201, among others) specific to a transaction to receive content 1214. The transaction gateway can further collect and/or store data regarding one or more users, wherein the data can be, but is not limited to, credit card numbers, to make it easier for the one or more users to engage in multiple transactions (e.g., simultaneously and/or various points in time). The transaction gateway can further reverse a transaction between one or more parties involved, such as providing a refund to the user.

It is to be appreciated that a purchase may not require the transfer of finances. For example, the content 1214 on the marketplace 1203 could be free to download. Additionally, a portion of the transaction system 1215 can be integrated into at least one of the content provider 1204, the marketplace host 1213, the marketplace application 1233, or a combination thereof. In another embodiment, the first content 1214 can be free but additional content related to the first content 1214 can require a purchase.

The content provider 1204 can create content 1214 (e.g., also referred to as products, software, apps, applications, and the like) that can be sold on the marketplace 1203. By way of example and not limitation, the content provider 1204 can be a videogame company that creates a game to be made available for download from the marketplace 1203. By way of another example and not limitation, a bank can develop a mobile banking application that is communicated to the marketplace 1203 and made available for download via the marketplace 1203. In such example, the bank is the content provider 1204. Additionally, the bank may host the mobile banking application on the bank's website for download or delivery to users. It is to be appreciated and understood that the content provider 1204 is not limited to these examples and the content provider 1204 can be any suitable entity (e.g., user, company, business, group of users, and the like) that creates or develops content 1214 to be distributed to the marketplace host 1213 for download via the marketplace 1203.

In particular, the content provider 1204 can allow a portion of the container tracking application 604 be made available for download.

The marketplace host 1213 maintains the marketplace 1203 on a network. The marketplace host 1213 owns and/or controls a host server that contains the marketplace 1203, and provides the user access to the marketplace 1203. The marketplace host 1213 can further control an amount of bandwidth allocated to the user to download the content 1214 of the one or more content providers 1204. In a non-limiting embodiment, the marketplace host 1213 can own and/or control the marketplace 1203. In another non-limiting embodiment, the marketplace host 1213 can host the marketplace 1203 on a network to enable access by the user.

In an exemplary embodiment, a user accesses the marketplace 1203 via the marketplace application 1233 located on the computing device 1201. The computing device 1201 can have access to the network 1205, and the computing device 1201 can communicate data in the form of a query to the marketplace host 1213, wherein the data can be a request for information on content 1214. The marketplace host 1213 can communicate data in the form of a query result (which can include content 1214) via a network to the computing device 1201 for review, install, use, storage, and the like. In a non-limiting embodiment, the computing device 1201 can include a user-interface that displays the data (e.g., the query, the query result, the content 1214, among others) for the user.

Prior to download of content 1214, the user can further navigate information regarding the content 1214 that is displayed and select to either request additional content 1214 or to purchase the content 1214. If the user selects to purchase content 1214, the marketplace application 1233 communicates a purchase request to the marketplace host 1213. The marketplace host 1213 can then use the transaction system 1215 which includes the transaction gateway charging the user account if data related to the user account is available, and if the user account is not available, then the marketplace host 1213 can request user account 1212 information from the user which can then be sent to the transaction gateway. Upon receipt of the user account information, the transaction gateway can charge the user account, and send a confirmation of the transaction back to the marketplace host 1213.

The marketplace host 1213 can then communicate the confirmation information to the computing device 1201, as well as enable the user to download data for the content 1214 and/or the marketplace application 1233 stored in a host server regarding the specific content 1214 and/or marketplace application 1233 purchased. The marketplace application 1233 can further assist with installation of the content 1214 or marketplace application 1233 purchased onto the computing device 1201. It is to be appreciated and understood that the above process can occur in any order, such as a downloading of application information from the marketplace host 1213 prior to the transaction and the order of the above described process is not to be limiting on the subject innovation.

One of ordinary skill in the art can appreciate that the various embodiments of the container tracking application 604 described herein can be implemented in connection with any computing device, client device, or server device, which can be deployed as part of a computer network or in a distributed computing environment such as the cloud. The various embodiments described herein can be implemented in substantially any computer system or computing environment having any number of memory or storage units, any number of processing units, and any number of applications and processes occurring across any number of storage units and processing units. This includes, but is not limited to, cloud environments with physical computing devices (e.g., servers) aggregating computing resources (i.e., memory, persistent storage, processor cycles, network bandwidth, etc.) which are distributed among a plurality of computable objects. The physical computing devices can intercommunicate via a variety of physical communication links such as wired communication media (e.g., fiber optics, twisted pair wires, coaxial cables, etc.) and/or wireless communication media (e.g., microwave, satellite, cellular, radio or spread spectrum, free-space optical, etc.). The physical computing devices can be aggregated and exposed according to various levels of abstraction for use by application or service providers, to provide computing services or functionality to client computing devices. The client computing devices can access the computing services or functionality via application program interfaces (APIs), web browsers, or other standalone or networked applications. Accordingly, aspects of the container tracking application 604 can be implemented based on such a cloud environment. For example, the container tracking application 604 can reside in the cloud environment such that the computer-executable instruction implementing the functionality thereof are executed with the aggregated computing resources provided by the plurality of physical computing devices. The cloud environment provides one or more methods of access to the subject innovation, which are utilized by the container tracking application 604. In an embodiment, software and/or a component can be installed on a mobile device to allow data communication between the mobile device and the cloud environment. These methods of access include IP addresses, domain names, URLs, etc. Since the aggregated computing resources can be provided by physical computing device remotely located from one another, the cloud environment can include additional devices such as a routers, load balancers, switches, etc., that appropriately coordinate network data.

Figure 13:
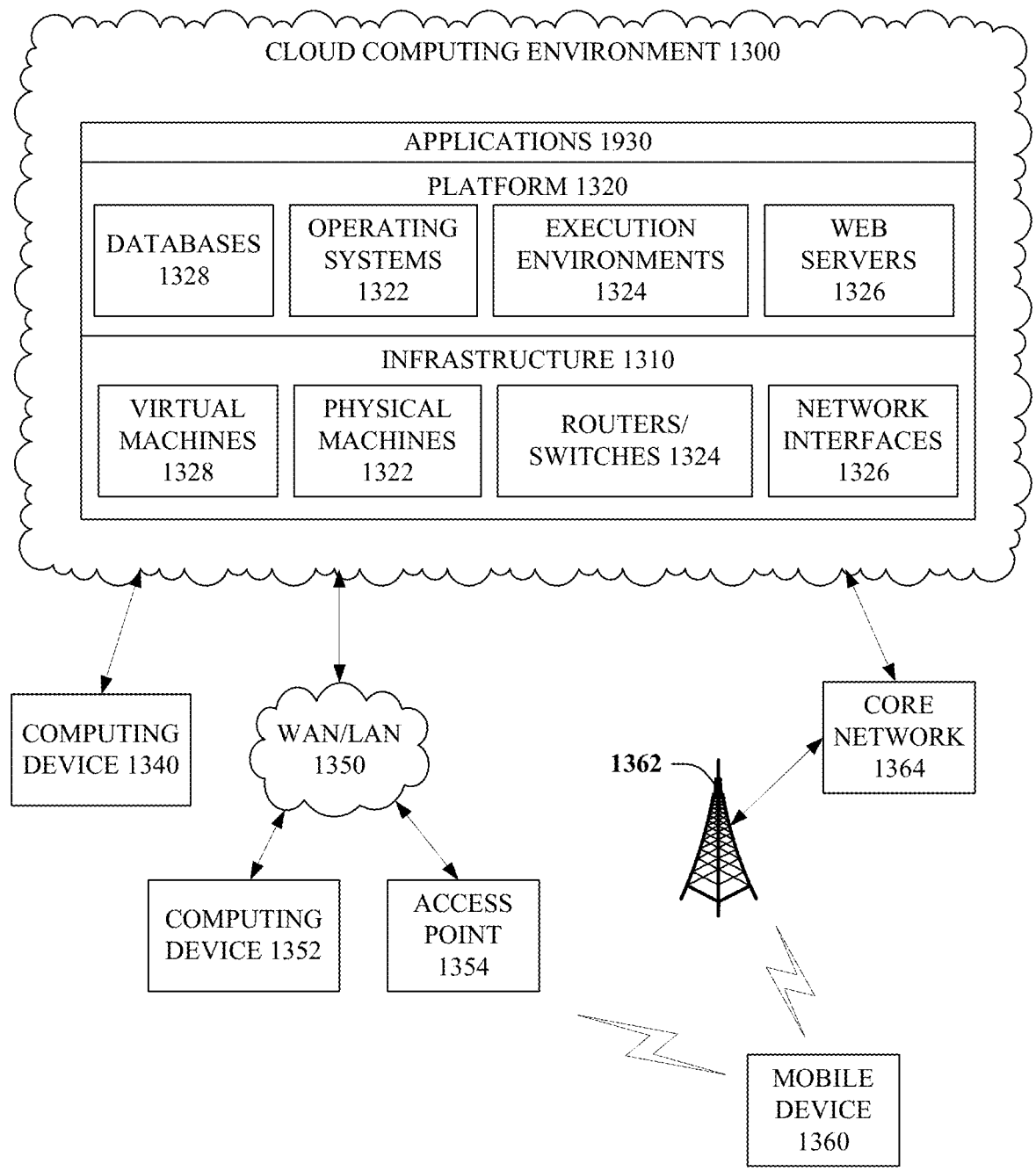
FIG. 13 is a schematic block diagram illustrating illustrates a cloud computing environment in accordance with the subject innovation.

FIG. 13 provides a schematic diagram of an exemplary networked or distributed computing environment, such as a cloud computing environment 1300. The cloud computing environment 1300 represents a collection of computing resources available, typically via the Internet, to one or more client devices. The cloud computing environment 1300 comprises various levels of abstraction: infrastructure 1310, a platform 1320, and applications 1330. Each level, from infrastructure 1310 to applications 1330 is generally implemented on top of lower levels, with infrastructure 1310 representing the lowest level.

Infrastructure 1310 generally encompasses the physical resources and components on which cloud services are deployed. For instance, infrastructure 1310 can include virtual machines 1312, physical machines 1314, routers/switches 1316, and network interfaces 1318. The network interfaces 1318 provide access to the cloud computing environment 1300, via the Internet or other network, from client devices such as computing devices 1340, 1352, 1360, etc. That is, network interfaces 1318 provide an outermost boundary of cloud computing environment 1300 and can couple the cloud computing environment 1300 to other networks, the Internet, and client computing devices. Routers/switches 1316 couple the network interfaces 1318 to physical machines 1314, which are computing devices comprising computer processors, memory, mass storage devices, etc. Hardware of physical machines 1314 can be virtualized to provide virtual machines 1312. In an aspect, virtual machines 1312 can be executed on one or more physical machines 1314. That is, one physical machine 1314 can include a plurality of virtual machines 1312.

Implemented on infrastructure 1310, platform 1320 includes software that forming a foundation for applications 1330. The software forming platform 1320 includes operating systems 1322, programming or execution environments 1324, web servers 1326, and databases 1328. The software of platform 1320 can be installed on virtual machines 1312 and/or physical machines 1314.

Applications 1330 include user-facing software applications, implemented on platform 1320, that provide services to various client devices. In this regard, at least the container tracking application 604 as described herein is an example application 1330. As illustrated in FIG. 13, client devices can include computing devices 1340, 1352 and mobile device 1360. Computing devices 1340, 1352 can be directly coupled to the Internet, and therefore the cloud computing environment 1300, or indirectly coupled to the Internet via a WAN/LAN 1350. The WAN/LAN 1350 can include an access point 1354 that enables wireless communications (e.g., WiFi) with mobile device 1360. In this regard, via access point 1354 and WAN/LAN 1350, mobile device 1360 can communicate wirelessly with the cloud computing environment 1300. Mobile device 1360 can also wirelessly communicate according to cellular technology such as, but not limited to, GSM, LTE, WiMAX, HSPA, etc. Accordingly, mobile device 1360 can wireless communicate with a base station 1362, which is coupled to a core network 1364 of a wireless communication provider. The core network 1364 includes a gateway to the Internet and, via the Internet, provides a communication path to the cloud computing environment 1300.

In an aspect, incorporated is an APPENDIX A (attached). APPENDIX A is a document that describes aspects of the claimed subject matter, and this Appendix forms part of this specification.

In an aspect, incorporated is an APPENDIX B (attached). APPENDIX B is a document that describes aspects of the claimed subject matter, and this Appendix forms part of this specification.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A system, comprising:
  a container having a top, a bottom opposite the top, a sidewall in between the top and the bottom, the container configured to hold a volume under a pressure;
  a delivery line coupled to an opening in the container that conveys the volume to a tap for dispensing of the volume;
  a sensor coupled to the container, the sensor tracks a temperature of the container, an amount of force taken by the container, and a light exposure to the container;
  a gateway device that wirelessly receives data from the sensor based on the sensor coming within a predefined distance of the gateway device, upon coming within the predefined distance, the sensor communicates a first data package that includes the temperature, the amount of impact, the light exposure and an identification of the sensor;
  the gateway device creates a second data package that includes a time stamp of when the first data package was communicated, an identification of the gateway device, and the first data package; and
  a track component that is configured to:
    receive of the second data package;
    evaluate of the time stamp from the gateway device and the identification of the gateway;
    identify of a geographic location of the gateway device and the sensor coupled to the container based upon comparing the identification of the gateway device to a collection of geographic locations having gateway devices each with a respective identification;
    monitor the temperature, the amount of force, and the light exposure for the container at the geographic location;
    communicate data to the sensor via the gateway device or to the gateway device; and
    communicate a notification if at least one of the temperature, the amount of force, or the light exposure exceeds a predefined threshold.

2. The system of claim 1, further comprising a glycol unit that refrigerates a portion of the delivery line.

3. The system of claim 2, the sensor further comprises one or more components that are configured to detect a temperature of glycol from a glycol unit that refrigerates a portion of the delivery line.

4. The system of claim 3, the sensor further comprises:
a first sensing component configured to detect a first glycol temperature within a reservoir of the glycol unit;
a second sensing component configured to detect a second glycol temperature at a location where the glycol exits the reservoir;
a third sensing component to detect a third glycol temperature at a location where the glycol returns to the reservoir; and
the gateway device communicates the first glycol temperature, the second glycol temperature, and third glycol temperature to the track component via the second data package.

5. The system of claim 4, the track component is further configured to communicate a notification if a range of variance between the first glycol temperature, the second glycol temperature, and the third glycol temperature is between one (1) degrees to seven (7) degrees Fahrenheit.

6. The system of claim 5, wherein the notification relates to a request for an inspection of the delivery line or a repair of the delivery line.

7. The system of claim 1, further comprising at least one of:
a sensor that includes one or more components to detect a weight of the container or a flow of contents leaving the container and the gateway device communicates the weight and the flow to the track component via the second data package; and
a pressure sensor that includes one or more components to detect a pressure in the delivery line, wherein the pressure is related to a $CO_2$ or a nitrogen.

8. The system of claim 7, the track component is further configured to communicate a notification if:
the weight of the container is detected below a predefined weight or the flow of contents leaving the container is detected to be within a predefined range, wherein the predefined weight or the predefined range indicate the container is empty or the container is proximately empty; or
the pressure of the container is detected below a predefined pressure within the line, wherein the predefined pressure indicates a range of approved pressure in the delivery line.

9. The system of claim 8, wherein the notification relates to a request for at least one of a reorder of a contents in the container, an automated request to replace the contents of the container with a full container, a scheduled return date for the container, a scheduled pickup for the container, a repair to the delivery line, an inspection to the delivery line, a restriction or limitation on releasing contents of the container, a communication to cease emptying contents of the container, or an inquiry whether a purchase is desired.

10. The system of claim 1, further comprising a sensing component to detect a ratio of glycol and water and the gateway device communicates the ratio to the track component via the second data package.

11. The system of claim 10, the sensing component further comprising:
a light source to shine a light through a clear tubing of a clear tubing for a glycol refrigerate unit, the clear tubing having the mixture of glycol and water mixture;
a receiving source opposite of the light source that receives the light that passed through the clear tubing and the mixture to provide a refraction;
the refraction is used to calculate a ratio of the water to glycol to get a reading of the mixture.

12. The system of claim 11, the track component communicates a notification related to a repair or adjustment to the line or the glycol unit.

13. The system of claim 1, further comprising:
an additional gateway device that is configured to create a third data package that includes a time stamp of when the second data package was communicated, an identification of the additional gateway device, the second data package, and the first data package;
a track component that is configured to perform:
receipt of the third data package; and
evaluation of the data contained with the third data package.

14. A refrigerator system, comprising:
one or more containers housed within a refrigerator environment;
each container having a top, a bottom opposite the top, a sidewall in between the top and the bottom, the container configured to hold a content in a volume under a pressure;
a first sensor coupled to the container, the first sensor tracks a temperature of the container;
a second sensor located within the refrigerator environment, the sensor tracks a temperature of the refrigerator environment;
a first gateway device that is located within the refrigerator environment and hardwired to a second gateway device that is located outside the refrigerator environment, the first gateway device receives data from at least one of the first sensor or the second sensor in response to an electronic instruction, the at least one of the first sensor or the second sensor communicates a first data package that includes at least one of the temperature of the container or the temperature of the refrigerator environment;
the first gateway device communicates the first data package to the second gateway device via the hardwired connection;
the second gateway device creates a second data package that includes a time stamp of when the first data package was communicated, an identification of the gateway device, and the first data package; and
a track component that is configured to:
communicate the electronic instruction to the first gateway device via the second gateway device;
communicate data to the sensor via the second gateway device and the first gateway device;
receive the second data package;
evaluate of the time stamp from the second gateway device and the identification of the gateway device;
identify of a geographic location of the second gateway device and the sensor coupled to the container based upon comparing the identification of the gateway device to a collection of geographic locations having gateway devices each with a respective identification;
monitor the temperature of the container and the temperature of the refrigerator environment at the geographic location; and communicate a notification if at least one of the temperature of the container or the temperature of the refrigerator environment is outside a predefined range or threshold.

15. The refrigerator system of claim 14, further comprising:
a sensor coupled to the container, the sensor tracks a temperature of the container, an amount of force taken by the container, and a light exposure to the container;
a sensing component to detect a ratio of glycol and water and the gateway device communicates the ratio to the track component via the second data package;
a sensor configured to detect a temperature of glycol from a glycol unit that refrigerates a portion of the delivery line; and
the gateway device communicates the temperature, the amount of force, the light exposure, the ratio, and the temperature of glycol to the track component via the second data package.

16. The refrigerating system of claim 14, further comprising a sensor that includes one or more components to detect a weight of the container or a flow of contents leaving the container and the gateway device communicates the weight and the flow to the track component via the second data package.

17. The refrigerator system of claim 16, further comprising an instruction that is communicated to purchase an additional container to replace the container that is identified by the track component as empty due to the flow or the weight detected by the sensor.

18. The refrigerator system of claim 14, further comprising a portion of data stored on a memory of the sensor, wherein the portion data is a batch date for the content of the container, a geographic location of where the content was made, a name of a person involved in the making of the content of the container, or a time when the container is filled.

19. The refrigerator system of claim 14, further comprising a device that is configured to communicate directly with at least one of the sensor or the gateway device to receive the first data package or the second data package respectively based upon the device communicating an authentication code that is verified by the track component.

20. A system, comprising:
a container having a top, a bottom opposite the top, a sidewall in between the top and the bottom, the container configured to hold a volume under a pressure;
a delivery line coupled to an opening in the container that conveys the volume to a tap for dispensing of the volume;
a glycol unit that refrigerates a portion of the delivery line;
a sensor coupled to the container, the sensor tracks a temperature of the container, an amount of force taken by the container, and a light exposure to the container;
a first sensing component configured to detect a first glycol temperature within a reservoir of the glycol unit;
a second sensing component configured to detect a second glycol temperature at a location where the glycol exits the reservoir;
a third sensing component to detect a third glycol temperature at a location where the glycol returns to the reservoir;
a gateway device that wirelessly receives data from the sensor based on the sensor coming within a predefined distance of the gateway device, upon coming within the predefined distance, the sensor communicates a first data package that includes the temperature, the amount of impact, the light exposure and an identification of the sensor;
the gateway device creates a second data package that includes a time stamp of when the first data package was communicated, an identification of the gateway device, and the first data package;
a track component that receives the second data package and identifies a geographic location of the container and the temperature, the amount of force, the first glycol temperature, the second glycol temperature, the third glycol temperature, and the light exposure for at least one container;
a device that is configured to communicate directly with at least one of the sensor or the gateway device to receive the first data package or the second data package respectively based upon the device communicating an authentication code that is verified by the track component; and
the track component communicate a notification based on contents of the second data package and reference to a predefined threshold related to at least one of a temperature, an amount of force, a first glycol temperature, a second glycol temperature, a third glycol temperature, and a light exposure for the container.

* * * * *